United States Patent
Funada et al.

(10) Patent No.: US 7,955,785 B2
(45) Date of Patent: Jun. 7, 2011

(54) METHOD FOR FORMING FINE CONCAVO-CONVEX PATTERNS, METHOD FOR PRODUCING OPTICAL DIFFRACTION STRUCTURE, AND METHOD FOR COPYING OPTICAL DIFFRACTION STRUCTURE

(75) Inventors: Hiroshi Funada, Tokyo-to (JP); Fumihiko Mizukami, Tokyo-to (JP); Tetsuya Matsuyama, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 293 days.

(21) Appl. No.: 11/764,266

(22) Filed: Jun. 18, 2007

(65) Prior Publication Data

US 2007/0243475 A1 Oct. 18, 2007

Related U.S. Application Data

(62) Division of application No. 10/942,296, filed on Sep. 16, 2004, now Pat. No. 7,245,406.

(30) Foreign Application Priority Data

Sep. 17, 2003 (JP) .................. 2003-324608
Sep. 23, 2003 (JP) .................. 2003-333170
Sep. 26, 2003 (JP) .................. 2003-334750

(51) Int. Cl.
*G03H 1/26* (2006.01)
(52) U.S. Cl. .............. 430/321; 430/1; 430/2; 359/3; 264/1.31; 264/1.33; 264/1.36; 264/1.37; 264/1.38
(58) Field of Classification Search ............... None
See application file for complete search history.

(56) References Cited

U.S. PATENT DOCUMENTS

| | | | | | |
|---|---|---|---|---|---|
| 4,064,205 | A | * | 12/1977 | Landsman | 430/200 |
| 4,761,253 | A | * | 8/1988 | Antes | 264/1.31 |
| 5,164,227 | A | * | 11/1992 | Miekka et al. | 427/162 |
| 5,232,817 | A | * | 8/1993 | Kawakami et al. | 430/201 |
| 6,088,161 | A | * | 7/2000 | Lee | 359/567 |
| 6,376,017 | B1 | * | 4/2002 | Kaule et al. | 427/271 |
| 6,666,995 | B1 | * | 12/2003 | Meikka et al. | 264/1.31 |
| 6,864,034 | B2 | * | 3/2005 | Nishida et al. | 430/200 |
| 7,161,720 | B2 | * | 1/2007 | Erickson et al. | 359/2 |
| 7,245,406 | B2 | * | 7/2007 | Funada et al. | 359/12 |
| 2001/0056039 | A1 | * | 12/2001 | Yoshinari et al. | 503/227 |
| 2002/0105103 | A1 | * | 8/2002 | Kerfeld | 264/40.1 |
| 2004/0150135 | A1 | * | 8/2004 | Hennessey et al. | 264/293 |

FOREIGN PATENT DOCUMENTS

| | | | |
|---|---|---|---|
| EP | 665117 | * | 12/1994 |
| JP | 55-065525 | * | 5/1980 |
| JP | 59-099475 A | | 6/1984 |
| JP | 60-254174 | * | 12/1985 |

(Continued)

*Primary Examiner* — Martin J Angebranndt
(74) *Attorney, Agent, or Firm* — Ladas & Parry LLP

(57) ABSTRACT

A method for forming fine concavo-convex patterns by using a relief formation material 3 having a relief formation layer 2 composed of a resin having thermoplasticity and a relief pattern sheet 6 having on a surface thereof fine concavo-convex patterns 5, wherein a photothermal conversion layer 7 is formed in the relief formation material 3 or the relief pattern sheet 6; the photothermal conversion layer 7 is irradiated with light 8 to make the photothermal conversion layer 7 generate heat in the state that the relief formation layer 2 is brought into contact with the fine concavo-convex patterns 5; and the fine concavo-convex patterns 5 are formed on the relief formation layer 2.

3 Claims, 22 Drawing Sheets

FOREIGN PATENT DOCUMENTS

| | | |
|---|---|---|
| JP | 61-020723 | 1/1986 |
| JP | 01-253786 | 10/1989 |
| JP | 02-006187 | 1/1990 |
| JP | 02-095813 | 4/1990 |
| JP | 06-085103 A | 3/1994 |
| JP | 06-337315 A | 12/1994 |
| JP | 11-024539 A | 1/1999 |
| JP | 2000-221312 * | 8/2000 |
| JP | 2001-158044 | 6/2001 |
| JP | 2005-231231 * | 9/2005 |

* cited by examiner

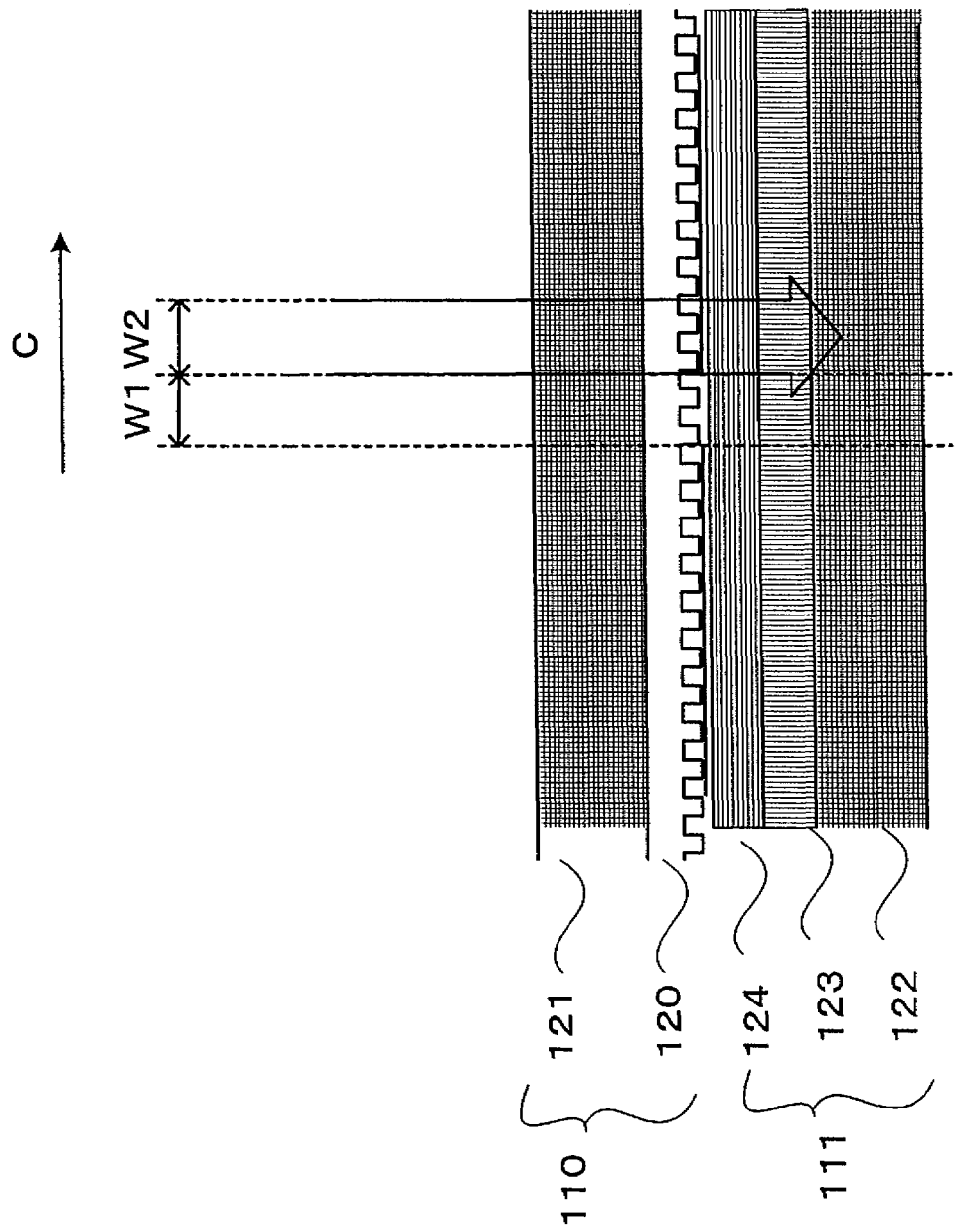

METHOD FOR FORMING FINE CONCAVO-CONVEX PATTERNS, METHOD FOR PRODUCING OPTICAL DIFFRACTION STRUCTURE, AND METHOD FOR COPYING OPTICAL DIFFRACTION STRUCTURE

CROSS-REFERENCE TO RELATED APPLICATIONS

This application is a divisional of U.S. patent application Ser. No. 10/942,296, filed Sep. 16, 2004, now U.S. Pat. No. 7,245,406.

BACKGROUND OF THE INVENTION

1. Field of the Invention

The present invention relates to a method for forming fine concavo-convex patterns in which relief holograms and diffraction lattices are recorded, a method for producing an optical diffraction structure composed of fine concavo-convex patterns, and a method for copying an optical diffraction structure.

2. Description of Related Art

Relief holograms and diffraction lattices are for recording interference fringes formed by interfering laser beams in form of fine concavo-convex patterns. The fine concavo-convex patterns are composed of several hundred to thousand fine projections in every 1 mm length.

In the case of copying the fine concavo-convex patterns, a copying forme is produced from a master hologram in which the interference fringes of laser beams are directly recorded and the concavo-convex patterns of the copying forme are transferred to a resin material to copy the fine concavo-convex patterns by mass production.

In a conventional case of forming a copying forme from a master hologram, it has been known to employ a method for producing diffraction patterns of phase diffraction lattices, phase holograms and the like by stamping the patterns in a thermoplastic resin with a casting die (a mother die) by pressure and heat. However, since formation of such plane patterns involves formations of a large number of phase diffraction lattices by repeating stamping many times in the thermoplastic resin and accordingly raised parts are generated in the boundary regions between the parts which are heated and pressurized and parts which are neither heated nor pressurized, it becomes difficult to arrange the patterns without any joining parts. Further, since the casting die is made of a metal, it has a high heat capacity and therefore, there occurs a problem that the previously stamped and neighboring patterns are forcibly eliminated in the peripheral region where stamping is carried out newly.

There is a method for forming fine concavo-convex patterns sharp in the stamping circumferential region without any raised parts to be obstacles by stamping a predetermined region in a simple manner so as to solve the above-mentioned disadvantages (reference to Japanese Patent Application Laid-Open No. 61-20723).

This method for forming a fine concavo-convex pattern is a method for forming concavo-convex patterns by stamping a predetermined surface area of a casting die having fine concavo-convex patterns to a thermoplastic resin and is carried out by heating approximately point-like generatrices of the thermoplastic resin at the focal point of an irradiation source by using the irradiation source and thus stamping the fine concavo-convex patterns of the casting die only to the generatrices so as to form the surface patterns in form of an assembly of a plurality of generatrices.

Particularly, a transparent substrate is fixed on a pressing plate and a material (a plastic layer colored by a colloidal carbon) which is thermoplastic and absorbs light beam is set on the opposed side of the plate and a no heat generation type casting die (made of a nickel alloy) is placed on the opposite to the plastic layer and a pressing force is generated in a dotted region between the casting die and the plastic layer by using a stamp having projected faces only in the focal point region. Further, an irradiation source comprising laser, an optical modulator, and a lens system is set in the opposed side to the side of the casting die in relation to the plate.

When laser beam (radiant ray) is beamed to the plastic layer for forming an image at the focal point, the plastic layer absorbs the radiant ray and is heated at the focal point region. Simultaneously with the heating by beaming radiant ray, pressure for stamping is applied by the stamp, so that point-like generatrix parts in the focal point region of the plastic layer are heated to the thermoplastic temperature and these parts are deformed plastically corresponding to the fine structure of the casting die and even after cooling, the fine structure is fixed and thus predetermined fine concavo-convex patterns are formed.

Also, as a method for forming an optical diffraction structure provided with the three-dimensional impression of a holographic image as well as the brightness and clearness of a diffraction lattice, there is a well-known technique for obtaining one optical diffraction structure in which interference fringes for forming the diffraction lattices and holographic images coexist by carrying out exposure and development of photographic images and diffraction lattices on a dry plate through a mask pattern (Japanese Patent Application Laid-Open No. 59-99475).

Further, production methods involving directly drawing lattice patterns of diffraction lattices and interference fringes of holographic images simulated using a computer by electron beam (Japanese Patent Application Laid-Open Nos. 6-337315 and 11-24539) have been known in these years.

SUMMARY OF THE INVENTION

However, the conventional method described in the Japanese Patent Application Laid-Open No. 61-20723 requires a stamp for applying pressure and an apparatus such as a pressure generating apparatus. The pressure generating apparatus comprises, for example, a ball holding unit and a ball to be put in a cylindrical space and the space is connected to a pressure generating source via a pneumatic pipe and a solenoid valve, and thus, the apparatus is complicated and therefore becomes costly.

Further, in the case of generating pressure only in the focal point region by using a stamp, it is very difficult to apply pressure precisely only to the predetermined fine region. Especially, in the case the formation speed of the fine concavo-convex patterns is to be increased, there is a limit to improve the formation speed only by the means of mechanically applying pressure.

With respect to the method for producing the above-mentioned optical diffraction structure in which the interference fringes for forming holographic images and diffraction lattices coexist, the exposure work has to be repeated and further development process is required and thus the production process becomes complicated and troublesome and takes a long time. Further, the above-mentioned production method by using electron beam requires a large scale apparatus and extremely complicated computation, resulting in extremely high production cost and long time and difficulty of the production of an optical diffraction structure in a scale as large as 100 cm² or larger.

Therefore, it is an object of the invention to provide a method for forming a fine concavo-convex pattern by which fine concavo-convex patterns are formed by a simple apparatus and the formation speed of the fine concavo-convex patterns is increased.

Further, it is another object of the invention to provide a method for producing and a method for copying an optical diffraction structure which neither cost high nor require troublesome work in the production process.

To solve the above-mentioned problems, the invention provides a method for forming fine concavo-convex patterns summarized as follows:

(1) a method for forming fine concavo-convex patterns by using a relief formation material having a relief formation layer composed of a resin having thermoplasticity and a relief pattern sheet having on a surface thereof relief patterns corresponding to fine concavo-convex patterns of a master hologram, wherein a photothermal conversion layer is formed in the relief formation material or the relief pattern sheet; the photothermal conversion layer is irradiated with light to make the photothermal conversion layer generate heat in the state that the relief formation material and the relief pattern sheet are brought into contact with each other in such a manner that the relief formation layer is brought into contact with the relief patterns; and the fine concavo-convex patterns of the master hologram corresponding to the relief patterns are formed on the relief formation layer;

(2) the method for forming fine concavo-convex patterns according to the above description (1), wherein the photothermal conversion layer is formed in the relief pattern sheet and the relief pattern sheet side is irradiated with the light;

(3) the method for forming fine concavo-convex patterns according to the above description (1), wherein the photothermal conversion layer is formed in the relief formation material;

(4) the method for forming fine concavo-convex patterns according to the above description (1) r wherein the relief formation layer is composed of an ionizing radiation-curable resin having thermoplasticity; and (5) the method for forming fine concavo-convex patterns according to the above description (1), wherein the relief formation material and the relief pattern sheet are closely attached to each other by vacuum adsorption.

Also, to solve the above-mentioned problems, the invention provides a hologram copying method as follows:

a hologram copying method for laminating a master hologram having an object region to be copied having interference fringes to express a hologram image in a concavo-convex form on a fusion layer formed on a base substrate, and fusing the fusion layer by heat to transfer the interference fringes to the fusion layer, wherein the master hologram and the fusion layer which are laminated mutually are irradiated with an energy beam in such a manner that an irradiation range is limited to a portion of the object region to be copied to fuse the fusion layer in the irradiation range by the heat based on the energy beam, and the interference fringes are successively transferred to the fusion layer by shifting the irradiation range in such a manner of moving along the interference fringes.

According to the invention, the mutually laminated fusion layer and the master hologram is irradiated with energy beam and the irradiation range is heated by the heat of the energy beam to fuse the fusion layer. Since the irradiation range of the energy beam is limited to a portion of the region to be copied in the master hologram, the range to be heated is limited to the irradiation range. Therefore, the range of the fusion layer to be fused by the heat is limited to the irradiation range and only the interference fringes included in the irradiation range of the master hologram are transferred to the fusion layer. If the irradiation range is shifted in such a manner of moving along the interference fringes, with the shift, the fusion layer in the irradiation range is successively fused, and from the fused portions, the interference fringes are transferred successively to the fusion layer.

In the invention, the concavo-convex forms of an existing master hologram are successively transferred, so that no development process is required. Further, it is required only to move the energy beam beamed to the laminated of the master hologram and the fusion layer, so that no complicated and large scale apparatus or system is necessary. Also, since the irradiation range of the energy beam to beam thereto is a portion of the region to be copied and the irradiation range is moved, the heat quantity kept in the fusion layer per a unit time can be kept low. Accordingly, even if the portion which is in the irradiation range is once heated, the heat kept in the portion is soon released immediately after the portion is out of the irradiation range, and the temperature of the portion is decreased to a level at which the fused fusion layer is hardened without any cooling facilities.

In the invention, "the region to be copied" means a range in the master hologram where the interference fringes to be transferred in one time process are formed. Accordingly, all of the interference fringes formed in the master hologram may be included in "the region to be copied" or a plurality of "the region to be copied" may be included in the master hologram.

"Energy beam" means energy beams having heat themselves just like so-called heat beam and also energy beams having no heat themselves. Accordingly, "heat of the energy beam" includes heat which the energy beam itself has and also heat which is generated by reaction occurring at the irradiation point of the energy beam, e.g. activation of electron or chemical reaction. An embodiment of irradiating the mutually layered fusion layer and master hologram which are mutually laminated with energy beam may include irradiation from the fusion layer side and irradiation from the master hologram side.

In the invention, a master hologram side may be irradiated with the energy beam in form of light energy, and the fusion layer may contain a substance for improving conversion efficiency from light energy to heat energy. In this case, consideration of the transmission of the energy beam in the base substrate and respective layers laminated on the base substrate is not needed. Further, addition of the substance such as carbon black for improving the conversion efficiency from light energy to heat energy to the fusion layer makes it easy to increase the temperature in the irradiation range of the energy beam in the fusion layer and the temperature in the portions out of the irradiation range is easy to get lower.

To solve the above-mentioned problems, the method for producing an optical diffraction structure according to the invention comprises: a copying process including the steps of; laminating a master hologram having an object region to be copied having interference fringes to express a hologram image in a concavo-convex form on a fusion layer formed on a base substrate, irradiating the master hologram and the fusion layer which are laminated mutually with an energy beam in such a manner that an irradiation range is limited to a portion of the object region to be copied to fuse the fusion layer in the irradiation range by heat based on the energy beam, and transferring the interference fringes successively to the fusion layer by shifting the irradiation range in such a manner of moving along the interference fringes; and a drawing process for drawing a predetermined shape on the fusion layer including the steps of; laminating a diffraction lattice on the fusion layer, irradiating the diffraction lattice and the fusion layer which are laminated mutually with an energy beam in such a manner that an irradiation range is limited to a portion of the diffraction lattice to fuse the fusion layer in the irradiation range by heat based on the energy beam, and transferring the diffraction lattice to the fusion layer by shifting the irradiation range in such a manner of drawing the predetermined shape.

Because of the same reasons as those in the case of the hologram copying method, the copying process of the invention is carried out to copy holograms without any cooling facilities. Further, in the drawing process, since the irradiation range of the energy beam is limited to a portion of the diffraction lattice, the diffraction lattice only in a range corresponding to the irradiation range is transferred to the fusion layer by the same reasons as those in the case of the hologram copying method. By shifting the irradiation range so as to draw a predetermined shape, the diffraction lattice as the predetermined shape can be transferred to the fusion layer.

In a conventional hologram copying method by heating, since the entire body of the master hologram is heated, the entire diffraction lattice is copied by employing such a method. On the other hand, in the invention, since the irradiation range, that is the heating range, can be limited to a portion of the diffraction lattice, a predetermined shape can be drawn by the diffraction lattice because of the above-mentioned reasons and the diffraction lattice in the predetermined shape and the copied interference fringes may be combined properly. In the invention, "optical diffraction structure" means a substance that at least a portion thereof has the optical diffraction structure of such as the diffraction lattice or a hologram.

In the method for producing an optical diffraction structure for the invention, the interference fringes and the diffraction lattice may be transferred so as to form one image by combination of the hologram image expressed by the interference fringes transferred in the copying process and the predetermined shape transferred in the drawing process. Accordingly, the optical diffraction structure expressing one image composed by combining the hologram image and the shape drawn by the diffraction lattices can be produced. The definition of the energy beam and the embodiment of the irradiation of the energy beam are same as described above in the hologram copying method and descriptions of them are not repeated.

A master hologram side may be irradiated with the energy beam in form of light energy, and the fusion layer may contain a substance for improving conversion efficiency from light energy to heat energy. Because of the same reasons as those in the above-mentioned hologram copying method, consideration of the transmission of the energy beam in the base substrate and respective layers layered on the base substrate is not needed and the temperature rising property by heat based on the energy beam can be improved.

Further, the drawing process may comprise a first drawing process of drawing a first predetermined shape on the fusion layer by a first diffraction lattice produced by photographing interference fringes by a plurality of laser beams at a position of focused image formation of the interference fringes by the plurality of laser beams; and a second drawing process of drawing a second predetermined shape on the fusion layer by a second diffraction lattice produced by photographing interference fringes of a plurality of laser beams at a position shifted from the position focused image formation of the interference fringes by the plurality of laser beams. Accordingly, in the produced optical diffraction structure, the interference fringes with the second predetermined shape focus on the point different in the depth direction from the interference fringes with the first predetermined shape. Consequently, pseudo-three-dimensional impression can be expressed in the optical diffraction structure by the first and the second predetermined shapes.

To solve the above-mentioned problems, the method for copying an optical diffraction structure according to the invention includes the steps of: laminating an optical diffraction structure master-hologram having an object region to be copied having optical interference fringes in a concavo-convex form on a fusion layer formed on a base substrate, irradiating the optical diffraction structure master-hologram and the fusion layer which are laminated mutually with an energy beam in such a manner that an irradiation range is limited to a portion of the object region to be copied to fuse the fusion layer in the irradiation range by heat based on the energy beam, and transferring the interference fringes successively to the fusion layer by shifting the irradiation range in the object region to be copied, wherein the step for transferring comprises: a first transfer process of successively transferring the interference fringes to the fusion layer by shifting the irradiation range of the energy beam in a predetermined direction so as to draw scanning lines, and a second transfer process of successively transferring the interference fringes in a boundary part of each of the scanning lines drawn in the object region to be copied to the fusion layer by irradiating the boundary parts with the energy beam and shifting the irradiation range of the energy beam in such a manner of moving along the scanning lines.

According to the invention, in the first transfer process, since the irradiation range of the energy beam is shifted in a predetermined direction so as to draw a scanning, with the shifting, the temperature in the portion of the fusion layer in the irradiation range is increased by the heat based on the energy beam to fuse the portion of the fusion layer and thus the interference fringes overlaid on the fused portion are successively transferred to the fusion layer. Next, in the second transfer process, the irradiation range is shifted along with the scanning lines while the energy beam is beamed to the boundary part of each scanning line drawn in the first transfer process. Accordingly, in the second transfer process, the fusion layer in the boundary part of the scanning line in the first transfer process is fused by the heat based on the energy beam, and with the shift of the energy beam, the interference fringes in the boundary part of the scanning line are successively transferred to the fusion layer along the scanning line.

In the invention, since both of the first transfer process and the second transfer process are only for successively transferring the concavo-convex form of an existing optical diffraction structure master-hologram, no development process is required and also since only energy beam is beamed to fuse the fusion layer, no complicated and large scale apparatus or system is required.

Further, since the energy quantity of the energy beam is high in the center part of the energy beam and low in the boundary part, the fusion layer is easy to be fused in the center part of the irradiation range of the energy beam and relatively difficult to be fused in the boundary part as compared with the center part. Therefore, in the surface of the fusion layer on completion of the first transfer process, the portion of the center part of the energy beam is mounted as compared with the portion of the boundary part and the surface of the fusion layer has a difference in the height. However, in the second transfer process, since the energy beam is beamed in such a manner that the boundary part of the scanning line of the energy beam in the first transfer process becomes the center of the irradiation range, the portion which was difficult to be fused by the energy beam in the first transfer process can be fused. Accordingly, the difference in the height of the surface of the fusion layer caused by the first transfer process can be amended and as a result, even in the case of carrying out copying by using the obtained optical diffraction structure as a master hologram, image deterioration by the copying can be prevented.

In the invention, "optical diffraction structure" means a structure including a hologram for forming a hologram image and a diffraction lattice, having optical interference fringes in form of the concavo-convex form, and generating a predetermined image based on the diffraction phenomenon of light. Further, "region to be copied" means the range in the optical diffraction structure master-hologram where the interference fringes to be transferred in one time transfer process are formed. Accordingly, the "region to be copied" may include entire interference fringes formed in the optical diffraction structure master-hologram and a plurality of "regions to be copied" may be included in the optical diffraction structure master-hologram. The embodiment of "drawing a scanning line in one direction" includes the case that respective lines are arranged in parallel if straight lines or wavy lines are employed as scanning lines transversely crossing the region to be copied and the case that scanning lines are drawn concentrically or spirally.

In the invention, "energy beam" means energy beams having heat themselves just like so-called heat beam and also energy beams having no heat themselves. Accordingly, "heat of the energy beam" means heat which the energy beam itself has and also heat which is generated by reaction at the irradiation point of the energy beam, e.g. activation of electron or chemical reaction. An embodiment of energy beam irradiation to the mutually laminated of the fusion layer and the master hologram may include irradiation from the fusion layer side and irradiation from the master hologram side. The relationship of the energy quantities of the energy beam in comparison of the first transfer process and the second transfer process may be same in some cases and different in other cases and may properly be set so as to obtain the flatness of the fusion layer of the finally obtained optical diffraction structure, depending on the material of the fusion layer and the type of the energy beam.

In the invention, an energy dose of the energy beam in the second transfer process may be equal to or lower than that of an energy beam in the first transfer process. The extent of the energy dose of the energy beam to be beamed is proportional to the size of the irradiation range and the size of the fused part of the fusion layer. Therefore, the energy quantities may be made different as described above, so that the fused part in the first transfer process can be made large and the fused part in the second transfer process can be made same as or smaller than the fused part in the first process. In such a case, it is preferable that the energy dose of the energy beam in the second transfer process is in a range of 0.3 to 1 time as much as that of the energy beam in the first transfer process. If it is in the range, with respect to the surface of the fusion layer of the obtained optical diffraction structure, it is made possible to obtain flatness sufficient to carry out copying without any undesirable consequences even if the obtained optical diffraction structure is used as a master hologram.

As the method for forming a fine concavo-convex pattern for the invention employs a method for forming the fine concavo-convex patterns of the master hologram corresponding to relief patterns of a relief pattern sheet in a relief formation layer by irradiating the photothermal conversion layer with light to make the photothermal conversion layer generate heat in the state that the relief formation layer of the relief formation material and the relief patterns of the relief pattern sheet are brought into contact with each other, so that as compared with a conventional method involving heating by beaming radiant ray and simultaneously applying pressure for stamping with a stamp, this method for the invention requires for the relief formation layer and the relief patterns only to contact with each other but no pressure application. Therefore, it is no need to use any apparatus such as the stamp or a pressure generating apparatus composed of complicated units and the apparatus can be simplified and the cost of the apparatus can be low.

Unlike the conventional method, it is no need to apply pressure only in the focal point region and to apply pressure precisely to only a predetermined narrow region. It is sufficient for the relief formation layer and the relief patterns to be brought into contact with each other evenly as a whole and the both can be brought into contact with each other extremely easily, so that the fine concavo-convex patterns can easily and reliably be formed. Further, since it is sufficient for the relief formation layer and the relief patterns to be brought into contact with each other and different from the conventional method, it is no need to apply pressure partially to a small region, the formation speed of the fine concavo-convex patterns can easily be increased.

In the invention, since the relief formation layer and the relief patterns are brought into contact with each other without pressure and no pressure is applied to the relief formation layer and the relief patterns, no damage owing to pressure is caused in them. Even materials weak to heat or pressure may be usable for the relief formation material or the substrate of the relief pattern sheet.

Also in the invention, in the case the photothermal conversion layer is formed in the relief pattern sheet side, it is no need to form any photothermal conversion layer to be colored dark by carbon black or the like in the relief formation material side and thus dark coloration of the relief formation material side can be avoided. Therefore, a product having fine concavo-convex patterns can be colored with any optional color and the invention can be applied to produce a variety of products.

Further, in the case of heating the photothermal conversion layer by beaming light, the light irradiation is carried out patternwise, so that the photothermal conversion layer can be made generate heat patternwise and the relief patterns can be heated in optional patterns and accordingly, simultaneously with the formation of the fine concavo-convex patterns, on-demand information can be produced.

If the relief formation material and the relief pattern sheet are closely attached to each other by vacuum adsorption, the relief formation layer of the relief formation material and the relief patterns of the relief pattern sheet are reliably brought into contact with each other and therefore, the fine concavo-convex patterns can be formed more reliably.

According to the hologram copying method and the method for producing an optical diffraction structure for the invention, the diffraction lattice and the hologram can be expressed as one image only by beaming energy beam to a portion of the region to be copied in the master hologram and the diffraction lattice without costing high or taking troublesome work.

Further, according to the copying method for the optical diffraction structure of the invention, stable optical diffraction structure can be copied without costing high or taking troublesome work by beaming energy beam to the optical diffraction structure master-hologram while drawing scanning lines in one direction and then beaming energy beam in the boundary parts of each of the scanning lines.

BRIEF DESCRIPTION OF THE DRAWINGS

FIG. 17 shows the state that the master hologram and the film for forming hologram shown in FIG. 16 are irradiated with IR laser;

DETAILED DESCRIPTION OF THE INVENTION

Figure 1A:
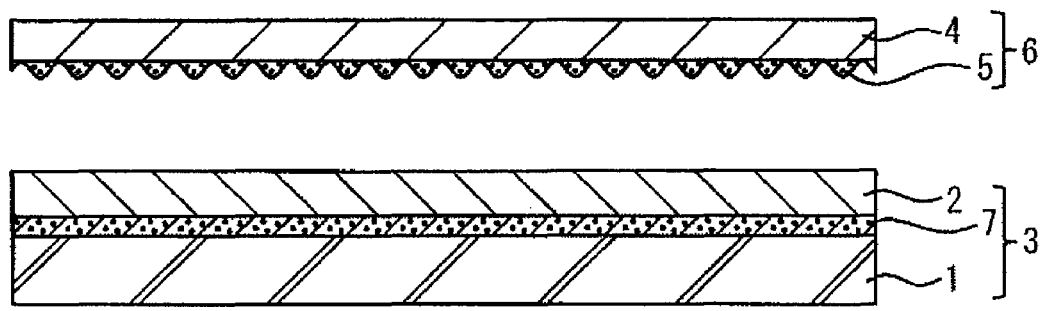
FIGS. 1A to 1C show one example of the diagrams of a method for forming fine concavo-convex patterns according to the invention.

First of all, an embodiment of execution of a method for forming a fine concavo-convex pattern for the invention will be described. Firstly, as shown in FIG. 1A, a relief formation material 3 provided with a relief formation layer 2 of a thermoplastic ionizing radiation-curable resin for forming fine concavo-convex patterns is formed on the surface of a substrate 1 composed of a polyethylene terephthalate film and so on, and a relief pattern sheet 6 having relief patterns 5 corresponding to the fine concavo-convex patterns of the master hologram is laminated on a substrate 4 composed of a polyethylene terephthalate film and so on. A photothermal conversion layer 7 is formed between the substrate 1 of the relief formation material 3 and the relief formation layer 2.

Figure 1B:
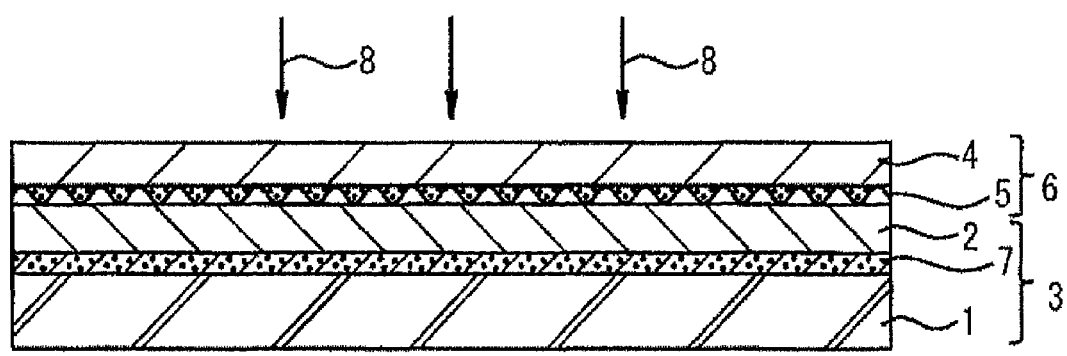

Next, as shown in FIG. 1B, in the state that the relief formation material 3 and the relief pattern sheet 6 are brought into contact with each other in such a manner that the relief formation layer 2 and the relief patterns 5 are closely attached, the photothermal conversion layer 7 is irradiated with light 8 such as laser beam from the substrate 4 side of the relief pattern sheet 6. The photothermal conversion layer 7 generates heat in the portion where the light is beamed. The heat of the photothermal conversion layer 7 is transmitted to the portion of the relief formation layer 2 contacting the heated portion of the photothermal conversion layer 7 to heat and fuse the thermoplastic resin of the relief formation layer 2. In the fused or softened relief formation layer 2, since the relief patterns 5 are closely attached to the relief formation layer 2, the fine concavo-convex shape, corresponding to the relief patterns 5 is formed in the relief formation layer 2.

In this method for the invention, the relief patterns 5 are brought into contact with and closely attached to the relief formation layer 2 and it is no need to apply pressure between the relief formation material 3 and the relief pattern sheet 6. However, to keep the close adhesion state of the relief formation layer 2 and the relief patterns 5, a laminate obtained by laminating the relief formation material 3 and the relief pattern sheet 6 may be sandwiched between supporting bodies of glass plates or the like to fix and hold the laminate.

If air exists between the relief patterns 5 and the relief formation layer 2, since the air possibly works as a heat insulating layer and it is therefore possible that heat is not well transmitted from the relief patterns 5 to the relief formation layer 2, air entrainment should carefully be avoided. To closely attach the relief formation layer 2 and the relief patterns 5 to each other without any air entrainment between them, the adhesion of the relief formation layer 2 and the relief patterns 5 may be carried out by vacuum adsorption for sucking and evacuating air between them by a vacuum pump or the like.

Figure 1C:
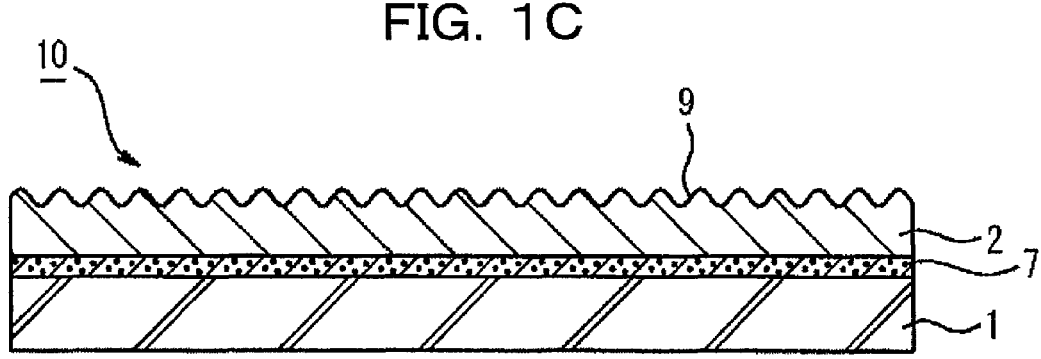

On completion of the light irradiation, when the relief pattern sheet 6 is separated from the relief formation material 3 in the state that the relief formation layer 2 composed of the thermoplastic resin is cooled, as shown in FIG. 1C, the fine concavo-convex patterns 9 of the master hologram are formed on the surface of the relief formation layer 2 and a relief pattern formation body 10 having the fine concavo-convex patterns 9 fixed thereon is obtained. After that, ionizing radiation is beamed to the relief formation layer 2 having the fine concavo-convex patterns 9 thereon to cure the ionizing radiation-curable resin of the relief formation layer 2.

Figure 2A:
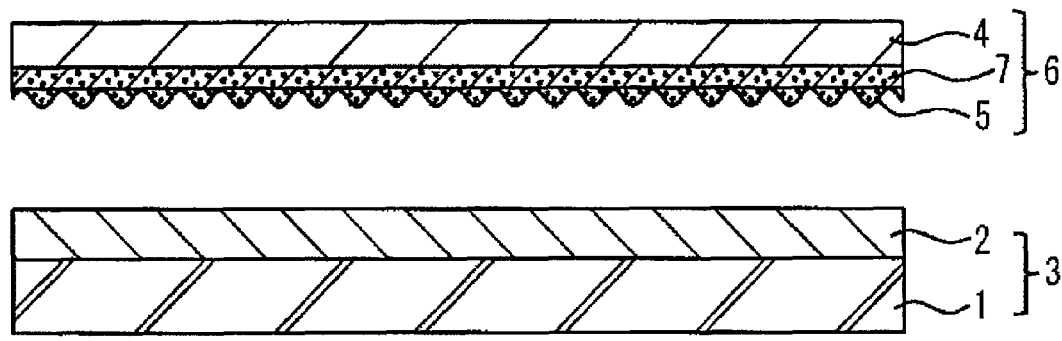
FIGS. 2A to 2C show another example of the diagrams of a method for forming fine concavo-convex patterns according to the invention.
Figure 2B:
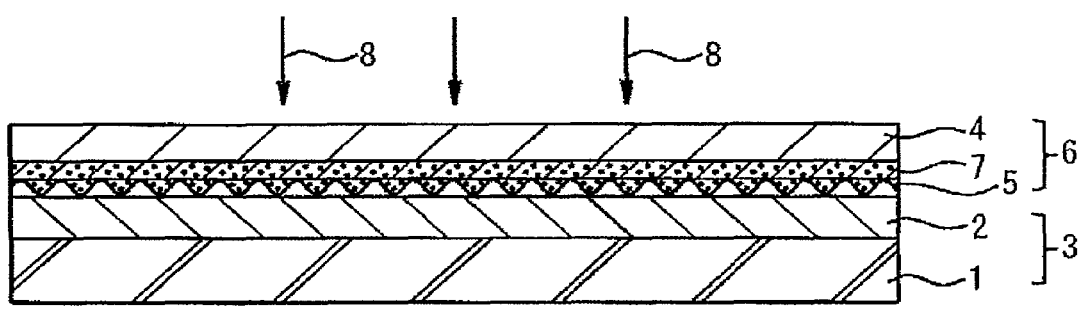
Figure 2C:
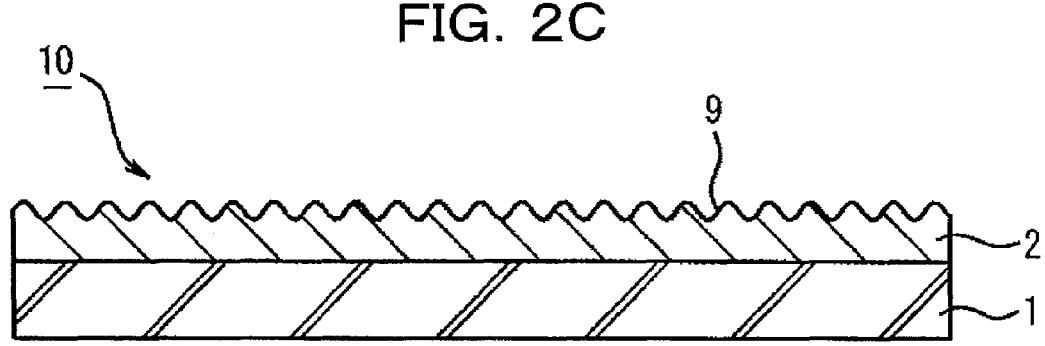

FIGS. 2A to 2C show another example of the flow diagrams of a method for forming a fine concavo-convex pattern according to the invention. In the embodiment of the invention shown in FIGS. 1A to 1C, the photothermal conversion layer 7 is formed in the relief formation material 3 side and light irradiation is carried out from the relief pattern sheet 6 side, however the photothermal conversion layer 7 may be formed in the relief pattern sheet 6 side. More particularly, as shown in FIG. 2A, the photothermal conversion layer 7 is formed between the substrate 4 of the relief pattern sheet 6 and the relief patterns 5 and the relief formation material 3 is composed of the substrate 1 and the relief formation layer 2 without photothermal conversion layer.

As shown in FIG. 2B, the relief pattern sheet 6 and the relief formation material 3 are closely attached to each other so as to bring the relief formation layer 2 and the relief patterns 5 into contact with each other. Then, as shown in the same figure, the photothermal conversion layer 7 is irradiated from the relief pattern sheet 6 side with light 8 to generate heat at the photothermal conversion layer 7 and thus the thermoplastic resin of the relief formation layer 2 is fused or softened to form the fine concavo-convex shape corresponding to the relief patterns 5 in the relief formation layer 2.

On completion of light irradiation, in the state that the relief formation layer 2 composed of the thermoplastic resin is cooled, when the relief pattern sheet 6 is separated from the relief formation material 3, as shown in FIG. 2, the fine concavo-convex patterns 9 of the master hologram are formed on the surface of the relief formation layer 2 to obtain the relief pattern formed body 10 in which the fine concavo-convex patterns 9 are fixed, and similarly to the embodiment shown in FIGS. 1A to 1C, ionizing radiation is beamed to the relief formation layer 2 having the fine concavo-convex patterns 9 formed thereon to cure the ionizing radiation-curable resin of the relief formation layer 2.

In this case, as shown in FIG. 2, since the finally obtained relief pattern formed body 10 has no photothermal conversion layer 7, the relief pattern formed body may be colored with any optional color and it can cause excellent design.

To beam light 8 to the photothermal conversion layer 7, for example an apparatus for generating laser beam may be employed. Further, in the case of beaming light to the photothermal conversion layer 7, light is beamed at spots from an irradiation source while the spots to which the light is beamed being moved so as to scan a predetermined region and thus the light irradiation is carried out to a desired portion. By beaming light in such a manner, heat generation in the necessary and optimum quantity can be carried out only for needed parts of the photothermal conversion layer 7 and therefore, the effect of heat can be suppressed to the minimum. Further, in the case of beaming light to the laminate body of the relief pattern sheet 6 and the relief formation material 3, as a support for the laminate body, an XY stage, a drum or the like can be used.

Figure 3:
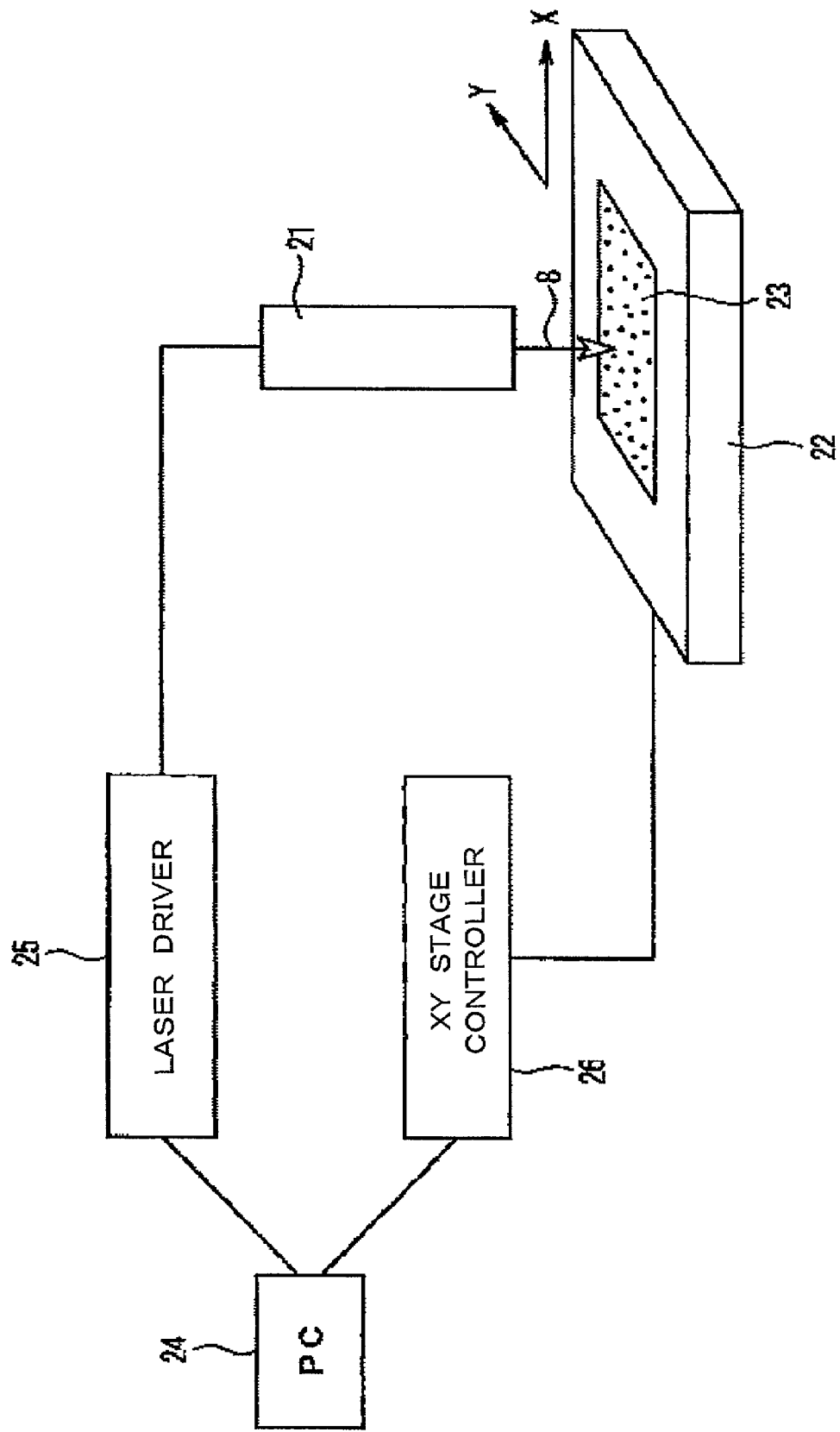
FIG. 3 shows an explanatory drawing schematically showing one example of an apparatus to be employed for the method for forming fine concavo-convex patterns according to the invention.

FIG. 3 shows an explanatory drawing schematically showing one example of an apparatus to be employed for the method for forming a fine concavo-convex pattern according to the invention. The apparatus shown in FIG. 3 comprises a laser head 21 as a light irradiation source and an XY stage 22 for controlling the irradiation position. The laser head 21 is provided with a laser driver 25 as a control system capable of adjusting or turning on or off output energy of the light source and is constructed to be controlled by a PC 24. Further, the laser head 21 is also provided with an optical system such as mirrors and lens for adjusting the laser light source, and the optical path and the focal point of the emitted light. The XY stage 22 is formed so as to set a laminate body 23, which is obtained by closely attaching the relief formation material 3 and the relief pattern sheet 6 to each other, on the surface and an XY stage controller 26 for controlling the movement of the XY stage 22 is connected so as to control the movement by the PC 24.

To carry out light irradiation by scanning light in spot form by using the apparatus shown in FIG. 3, the laminate body 23, which is obtained by closely attaching the relief formed body 3 and the relief pattern sheet 6 to each other, is set on a predetermined position of the surface of the XY stage 22. When the irradiation pattern is instructed from the PC 24, the laser head 21 is positioned as a starting point and the XY stage 22 is moved and the laser beam irradiation by the laser head 21 is turned on or off to carry out light irradiation in the predetermined pattern.

The light 8 beamed from the laser head 21 is made to be in spot shape with a diameter of not over 100 μm and is used for scanning the laminate body 23 along with a predetermined scanning pattern in the XY direction by operation of the XY stage 22 so as to irradiate the entire body of the laminate body 23 with the light 8. The photothermal conversion layer 7 of the laminate body 23 is irradiated with the laser beam as a small spot and the spot of the laser beam is successively moved by the scanning, so that the duration of the laser beam irradiation is extremely short. As a result, only a very narrow region like the spot in the relief formation layer 2 or the relief patterns 5 contacting the photothermal conversion layer 7 is heated for a short time, and after when the resin of the relief formation layer 2 is fused to form the pattern, the resin is cooled soon and the pattern formation state is immediately fixed.

At the time of irradiating the photothermal conversion layer 7 with light 8, it is preferable to properly select the wavelength of the light with a high transmittance to the substrate 1 and the substrate 4 so as to cause no damage on these substrates with the light transmitted through the substrates. For example, in the case of using laser beam and a polyethylene terephthalate film (sometimes referred to as PET) for the substrates 1 and 4, laser beam near the visible light and having wavelength with high transmittance to PET may properly be selected.

In the case of irradiating the photothermal conversion layer 7 with light, on-demand information can be produced by beaming light patternwise, not entirely, along with an any optional pattern, and generating heat in the photothermal conversion layer 7 patternwise to heat the relief formation layer 2 or the relief patterns 5 in the optional shape. As on-demand information, for example, particular information such as ID numbers of individuals can be used.

The concavo-convex patterns in which general information or common information such as a company's name is recorded are formed in the entire body of the relief formation layer 2 and on the portions of the gaps other than the regions where the concavo-convex patterns are formed or on the above-mentioned concavo-convex patterns, letters and signs of the particular information are directly drawn and recorded in form of concavo-convex patterns by scanning with the laser beam. In such a manner, the concavo-convex patterns of the common information are formed and at the same time, on-demand information can be recorded. The concavo-convex pattern formed body in which the particular information is recorded in the above-mentioned manner can improve the security if it is used as a security card such as an ID card.

The material placed between the photothermal conversion layer 7 and the light source (e.g. in the case of beaming light from the substrate 4 side in FIGS. 1A to 1C and FIGS. 2A to 2C, the substrate 4 and the relief patterns 5 shown in FIGS. 1A to 1C and the substrate 4 shown in FIGS. 2A to 2C) may be any material which can practically transmit light so as to lead light to the photothermal conversion layer 7.

As the ionizing radiation for curing the relief formation layer 2 of the ionizing radiation-curable resin in which the fine concavo-convex patterns 9 are formed, all kinds of UV rays (UV-A, UV-B, and UV-C), visible light rays, γ-beam, x-rays, and electron beam may be employed and UV rays and electron beam are preferable. With respect to the ionizing radiation apparatus 50, in the case UV rays as the ionizing radiation are beamed, as the light source, a UV lamp such as an ultra high pressure mercury lamp, a high-pressure mercury lamp, a low pressure mercury lamp, a carbon arc, a black light, a metal halide lamp or the like is used. The wavelength of the UV rays is generally about 200 to 400 nm and the wavelength may be selected depending on the composition of the resin layer. The irradiation dose is also controlled depending on the composition of the resin layer, the output power of the UV lamp, and the processing speed.

In the case electron beam is beamed as the ionizing radiation, the apparatuses to be employed are those which comprise various kinds of electron beam accelerators such as Cockcroft-Walton type, Van de Graaff type, the resonance transformer type, the insulator core transformer type, the linear type, the dynamitron type, and the high frequency type and which can beam electron beam in electron curtain manner or beam scanning manner or the like. Preferably, "Electrocurtain" (trade name) which can beam electron beam evenly in the curtain manner from a linear filament can be exemplified. The irradiation dose of the electron beam is controlled by beaming about 0.5 to 20 Mrad of electron beam with electrons having energy of generally 100 to 1,000 keV, preferably 100 to 300 keV. With respect to the atmosphere at the time of irradiation, the oxygen concentration is controlled to be not over 500 ppm, preferably about 200 ppm in general.

Hereinafter, the relief formation material 3 and the relief pattern sheet 6 will be described more in details.

As the substrate 1 of the relief formation material 3, any film type (including sheet type) material may be used without any particular limitation. Practical examples of usable films are polymer films (plastic films) such as films of polyester resins, e.g. polyethylene terephthalate, polybutylene terephthalate, polyethylene naphthalate, polyethylene terephthalate-isophthalate copolymer, terephthalic acid-cyclohexanedimethanol-ethylene glycol copolymer, and extruded film of polyethylene terephthalate/polyethylene naphthalate mixture; polyamide type resins, e.g. nylon 6, nylon 6,6, and nylon 610; polyolefin type resins, e.g. polyethylene, polypropylene, and polymethylpentene; vinyl type resins, e.g. poly vinyl chloride; acrylic type resins, e.g. polyacrylate, polymethacrylate, and polymethylmethacrylate; imide type resins; engineering plastics, e.g. polyarylate, polysulfone, polyether sulfone, polyphenylene ether, polyphenylene sulfide (PPS), polyaramide, polyether ketone, polyether nitrile, polyether ether ketone, and polyether sulfide; styrene type resin, e.g. polycarbonate and ABS resin; and cellulose type films, e.g. cellophane, cellulose triacetate, cellulose diacetate, and nitrocellulose. The above-mentioned plastic films may be stretched films or non-stretched films and in terms of the strength improvement, uniaxially or diaxially stretched films are preferable.

As the substrate 1, other than the plastic films, paper, synthetic paper, and metal films such as iron and aluminum can be used. In terms of the light transmission property, plastic films are preferable. The above-mentioned films may be used alone or laminates of two or more kinds of the above-mentioned films may be used. The thickness of the substrate 1 is generally about 5 to 2000 μm. In general, as the substrate 1, a film of a polyester such as polyethylene terephthalate or polyethylene naphthalate is used preferably since it has heat resistance, size stability, and ionizing radiation resistance and a film of polyethylene terephthalate is used more preferably.

Prior to the application of a composition of the relief formation layer 2, the face of substrate 1 to be coated may be subjected to treatment for easy adhesion such as corona discharge treatment, plasma treatment, ozone treatment, flame treatment, primer (sometimes called as anchor coating, adhesion promoter, or easy adhesive) treatment, preheating treatment, dust removal treatment, or alkaline treatment. Also, based on the necessity, the substrate 1 may contain additives such as a filler, a plasticizer, a coloring agent, or an antistatic agent.

As the resin having thermoplasticity to be used for the relief formation layer 2, ionizing radiation-curable resins in solid state at a normal temperature and having heat formability are preferably used. Such ionizing radiation-curable resins contain thermoplastic substances having radical polymerizable unsaturated groups. Practically there are following two types of resins.

(1) Polymers having a glass transition temperature of 0 to 250° C. and comprising radical polymerizable unsaturated groups; more particularly, polymers or copolymers of the following compounds i) to viii) into which the radical polymerizable groups are introduced by the following methods (a) to (d);

i) monomers having hydroxyl: N-methylolacrylamide, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, 2-hydroxy-3-phenoxypropyl methacrylate, 2-hydroxy-3-phenoxypropyl acrylate, and the like;

ii) monomers having carboxyl: acrylic acid, methacrylic acid, acryloyloxyethyl monosuccinate, and the like;

iii) monomers having epoxy groups: glycidyl methacrylate and the like;

iv) monomers having aziridinyl: 2-aziridinylethyl methacrylate, allyl 2-aziridinyl propionate, and the like;

v) monomers having amino groups: acrylamide, methacrylamide, diacetoneacrylamide, dimethylaminoethyl methacrylate, diethylaminoethyl methacrylate, and the like;

vi) monomers having sulfonyl: 2-acrylamido-2-methylpropanesulfonic acid, and the like;

vii) monomers having isocyanate groups: radical polymerizable monomer having adduct of diisocyanate such as an equimolecular adduct of 2,4-toluene diisocyanate and 2-hydroxyethyl acrylate and active hydrogen; and, viii) In order to adjust the glass transition point of the above-mentioned polymers or copolymers or to adjust the physical properties of the cured films, the above-mentioned monomers can be copolymerized with the following copolymerizable monomers: methyl methacrylate, methyl acrylate, ethyl acrylate, ethyl methacrylate, propyl acrylate, propyl methacrylate, butyl acrylate, butyl methacrylate, isobutyl acrylate, isobutyl methacrylate, t-butyl acrylate, t-butyl methacrylate, isoamyl acrylater isoamyl methacrylate, cyclohexyl acrylate, cyclohexyl methacrylate, 2-ethylhexyl acrylate, 2-ethylhexyl methacrylate, and the like.

The methods (a) to (d) for introducing radical polymerizable unsaturated groups into the above-mentioned polymers are as follows.

(a) In the case of polymers or copolymers of monomers having hydroxyl, condensation reaction of monomers having carboxyl such as acrylic acid and methacrylic acid is carried out;

(b) in the case of polymers or copolymers of monomers having carboxyl or sulfone groups, condensation reaction of the above-mentioned monomers having hydroxyl is carried out;

(c) in the case of polymers or copolymers of monomers having epoxy groups, isocyanate groups, oraziridinyl, addition reaction of the above-mentioned monomers having hydroxyl or carboxyl is carried out; and (d) in the case of polymers or copolymers of monomers having hydroxyl or carboxyl, addition reaction of monomers having epoxy groups, monomers having aziridinyl, or adducts of diisocyanate compounds and hydroxyl-containing acrylic acid esters in 1:1 mole ratio.

To carry out the above-mentioned reaction, it is preferable to add a slight amount of a polymerization inhibitor such as hydroquinone and to send dry air.

(2) Compounds having a fusing point of 0 to 250° C. and comprising radical polymerizable unsaturated groups; more particularly, stearyl acrylate, stearyl methacrylate, triacryl isocyanurate, cyclohexanediol diadrylate, cyclohexanediol dimethacrylate, spiroglycol diacrylate, spiroglycol dimethacrylate, and the like.

As the resin of the relief formation layer 2, mixtures of the above-described (1) and (2) may be used and also mixtures further containing the radical polymerizable unsaturated monomers may be used. The radical polymerizable unsaturated monomers are for improving the crosslinking density and heat resistance at the time of ionizing radiation and examples to be used as the monomers other than the above exemplified compounds are ethylene glycol diacrylate, ethylene glycol dimethacrylate, polyethylene glycol diacrylate, polyethylene glycol dimethacrylate, hexanediol diacrylate, hexanediol dimethacrylate, trimethylolpropane triacrylate, trimethylolpropane trimethacrylate, trimethylolpropane diacrylate, trimethylolpropane dimethacrylate, pentaerythritol tetraacrylate, pentaerythritol tetramethacrylate, pentaerythritol triacrylate, pentaerythritol trimethacrylate, dipentaerythritol hexaacrylate, dipentaerythritol hexamethacrylate, ethylene glycol diglycidyl ether diacrylate, ethylene glycol diglycidyl ether dimethacrylate, polyethylene glycol diglycidyl ether diacrylate, polyethylene glycol diglycidyl ether dimethacrylate, propylene glycol diglycidyl ether diacrylate, propylene glycol diglycidyl ether dimethacrylate, polypropylene glycol diglycidyl ether diacrylate, polypropylene glycol diglycidyl ether dimethacrylate, sorbitol tetraglycidyl ether tetraacrylate, sorbitol tetraglycidyl ether tetramethacrylate, and the like. It is preferably to use them in an amount of 0.1 to 100 parts by weight in 100 parts by weight of the solid matter of the above-mentioned copolymer mixtures.

The above-mentioned ionizing radiation-curable resin is sufficiently cured by electron beam and in the case curing is carried out by UV irradiation, it is better to add a photopolymerization initiator such as acetophenones, benzophenones, Michlers's benzoyl benzoate, α-aminoxime ester, tetramethylmeuram monosulfide, and thioxanthones and base on the necessity, a photosensitizer such as n-butylamine, triethylamine, and tri-n-butylphosphine.

The above-mentioned ionizing radiation-curable resin can be cured by heat energy if a proper catalyst exists.

The ionizing radiation-curable resin being in solid state at a normal temperature and having heat formability to be used for the relief formation layer 2 is applied to the substrate 1 in a thickness of generally 0.1 to 50 μm, preferably 0.5 to 5 μm, in the case a hologram is copied in form of concavo-convex patterns. The thickness differs depending on intended use of the fine concavo-convex patterns to be copied.

The relief formation layer 2 can be formed on the substrate 1 by known coating method such as spin coating, knife coating, roll coating, or bar coating. In the case of forming the relief formation layer 2 on a portion of the substrate 1, a common printing technique such as screen printing and gravure printing, or a transfer method can be employed.

With respect to the relief formation material 3 comprising the relief formation layer 2 of the ionizing radiation-curable resin in solid state at a normal temperature formed on the substrate 1, since the relief formation layer 2 is formed in solid state at a normal temperature to form in a finger-touch-dry state, the material 3 can be stored while being laminated.

A separation layer (not illustrated) may be formed between the substrate 1 and the relief formation layer 2. The separation layer can provide separation property, wear resistance, and printing suitability between the substrate 1 and the relief formation layer 2. As the resin of the separation layer, a wide range of conventionally known resins such as acrylic resins, cellulose type resins, vinyl resins, polyester resins, urethane resins, olefine resins, amide resins, and epoxy resin may be used. The thickness of the separation layer is generally 0.05 to 10 μm, preferably 0.2 to 2 μm.

The relief patterns 5 of the relief pattern sheet 6 are formed as concavo-convex patterns corresponding to the fine concavo-convex patterns 9 of the master hologram. As the fine concavo-convex patterns 9, holograms such as relief holograms, optical diffraction structure such as diffraction lattice, and hair lines may be used.

As the images of the hologram, photographed images of actual objects, signs, letters, numerals, and illustrations may be used. The hologram images themselves can be obtained by calculation of hologram diffraction lattices, or can be produced with a proper means such as a holographic stereogram from digital images taken by a digital camera of from two- or three-dimensional images data of digital images of computer graphics other than photography of an actual object. The diffraction lattices can express images of letters or the like by their outlines.

For the relief hologram, a hologram where light intensity distributions of interference fringes caused by light interference between object light is recorded in form of ragged patterns and reference light and diffraction lattices can be employed. As the relief hologram, there are laser regeneration hologram such as Frenel hologram, Fraunhofer hologram, lens-less Fourier transform hologram, and image hologram; incandescence regeneration hologram such as rainbow hologram; and also holograms based on their principles: color hologram; computer hologram; hologram display; multiplex hologram; holographic stereogram; and holographic diffraction lattice.

As the diffraction lattice, there are holographic diffraction lattice using hologram recording means; and further any optional diffraction lattice based on calculation by mechanically or graphically producing diffraction lattice with a precision lathe or an electron beam drawing apparatus.

These hologram and diffraction lattice may be recorded singly or multiple-recorded or recorded in combination. The diffraction lattice can give particular brightness with excellent design properties by assembling a plurality of regions different in the ridge direction and/or ridge interval and/or shape of the concavo-convex form and/or height of the concavo-convex form, that is, regularly or randomly combining a plurality of regions having different diffraction directions.

A variety of known methods may be employed as a method for forming relief patterns 5 on the surface of the substrate 4 from the fine concavo-convex patterns of a master hologram. As a method for forming the relief patterns 5, there are methods: (1) a hologram copying method (called as semi-dry copying method) described in Japanese Patent Application Laid-Open No. 6-85103 by forming fine concavo-convex patterns of a master hologram for copying on an ionizing radiation-curing resin by pressure application, beaming ionizing radiation after or simultaneously with the pressure application, and separating the resin and the master hologram and (2) a photo polymerization method (called as 2 P method) by applying an ionizing radiation-curable resin in liquid state to the surface of the master hologram for copying, curing the resin by beaming ionizing radiation after spreading the resin on the surface to form fine ragged patterns, and obtaining a stamper by separating the formed resin from the master hologram for copying.

Figure 4A:
FIGS. 4A to 4F show the diagrams of the relief pattern formation method from a master hologram by 2 P method.
Figure 4B:
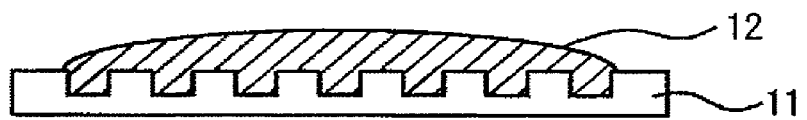
Figure 4C:
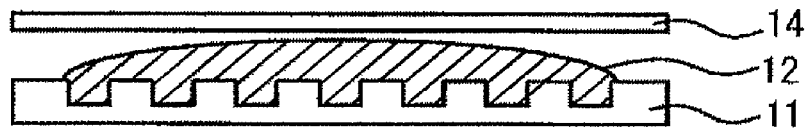
Figure 4D:
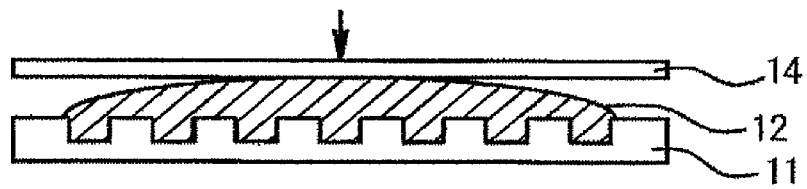
Figure 4E:
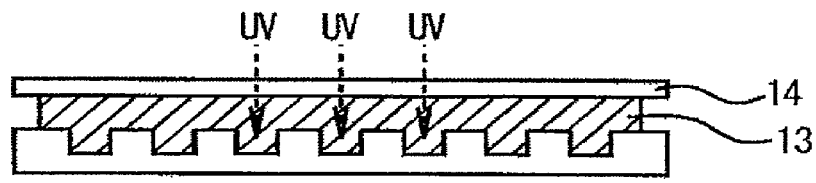
Figure 4F:
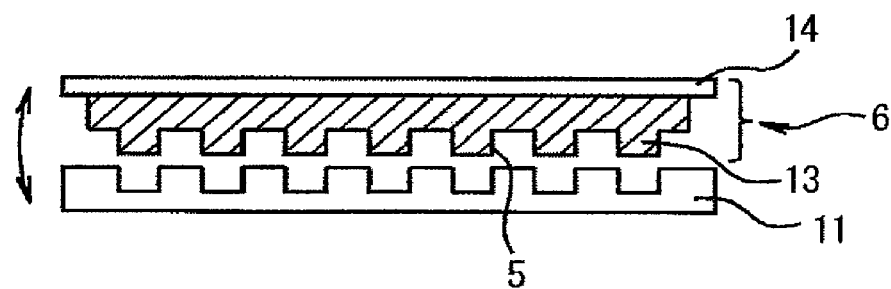

Hereinafter, the above-mentioned 2 P method will be described. FIG. 4A to FIG. 4F show the flow diagrams of the relief pattern formation method from a master hologram by 2 P method. As shown in FIG. 4A, a master hologram 11 having an uneven relief is used and as shown in FIG. 4B, an ionizing radiation-curable resin composition 12 is dropwise titrated on the master hologram 11. Next, as shown in FIGS. 4C and 4D, the substrate 14 is set on the resin and pressurized to spread the ionizing radiation-curable resin composition 12 to evenly fill the recessed parts. Next, as shown in FIG. 4E, ionizing radiation such as UV rays is beamed from the master hologram 11 side or the substrate 14 side to cure the ionizing radiation-curable resin composition 12. As shown in FIG. 4F, the ionizing radiation-curable resin composition 13 and the substrate 14 united together by curing are separated form the master hologram 11 to obtain a relief pattern sheet 6 comprising the ionizing radiation-curable resin composition 13 on the substrate 14 (the substrate 4) having the relief patterns 5.

As the material of the substrate 4 of the relief pattern sheet 6, metals, glass, or plastic films may be used. For example, in the case fine concavo-convex patterns are formed by rolling the relief pattern sheet 6 and the relief formation material 3 on the surface of a roll formed as a cylindrical cylinder, since it is easy to practically transmit the light beamed from a light irradiation apparatus, a plastic film is used preferably. As the plastic film to be used as the substrate 4, for example, a plastic film exemplified for the substrate 1 of the relief formation material 3 may be used.

The photothermal conversion layer 7 may be formed on the relief formation material 3 side, the relief pattern sheet 6 side, or both sized. The photothermal conversion layer 7 is any if it can absorb light 8 and convert the light to heat to generate heat and may be a layer formed using a binder resin such as thermoplastic resin and a heat-curable resin in which a light absorbing coloring material such as carbon black is dissolved or dispersed. The thickness of the photothermal conversion layer 7 is generally 0.1 to 5 µm and preferably 0.3 to 3 µm.

Other than carbon black, as the light absorbing coloring material to be used for the photothermal conversion layer 7, a variety of compounds can be used depending on the light to be beamed. For example, as a coloring material suitable for semiconductor laser, there are coloring materials such as polymethine type such as cyanine type and pyrylium type; phthalocyanine type coloring materials such as copper phthalocyanine; naphthalocyanine type coloring materials; dithiol metal complex type coloring materials; naphthoquinone type coloring materials; anthraquinone type coloring materials; tirphenylmethane type coloring materials; aluminum type coloring materials; and diimmonium type coloring materials. The photothermal conversion layer 7 can be formed by known coating means.

As the binder resin to be used for the photothermal conversion layer 7, polyesters; acrylic, epoxy, butyral and acetal resins; vinyl chloride-vinyl acetate copolymer; polyurethanes; thermoplastic high molecular weight epoxy can be exemplified. Polyesters are preferable.

The relief pattern formed body 10 obtained by a method for forming a fine concavo-convex pattern for the invention may be used as a master hologram for copying as it is. It may be used in a label form by layering an adhesive or separation paper on the substrate 1 side or a transfer material for hot stamp or a material for heat transfer using a thermal head by making it as a transfer foil by forming an adhesive layer in the substrate side.

Next, an image formation method for obtaining particular brightness with excellent design properties by combining a plurality kinds of relief patterns 5 by employing a method for forming the relief patterns 5 on the above-mentioned relief formation material 3 will be described. The photothermal conversion layer 7 can be provided either in the relief pattern sheet 6 or in the relief formation material 3 to be used in the formation method described below.

A plurality of relief pattern sheets 6 having diffraction lattice patters as relief patterns 5 are made ready in such a manner that the orientation angles of the diffraction lattice patterns are made different from one another and the respective diffraction lattice patterns are formed on relief formation layers 2 in such a manner that the transferred diffraction lattice patterns are adjoined with each other in a predetermined direction on the relief formation material 3.

Accordingly, if the diffraction lattice patterns are rotated, image patterns composed of bright points of the diffraction light rays are observed as if they are moving and so-called moving images are formed. The moving state may include continuous, semi-continuous, or discontinuous in a predetermined direction. To produce a state that the bright points are made as if they are moving continuously in a common environments, the alteration of the orientation angles of the adjoining diffraction lattices within 5 degrees. If the angles are changed more than that, the bright points move semi-continuously or discontinuously. "Orientation angles" means the angles of plane directions of the lines composing the diffraction lattices.

Figure 5:
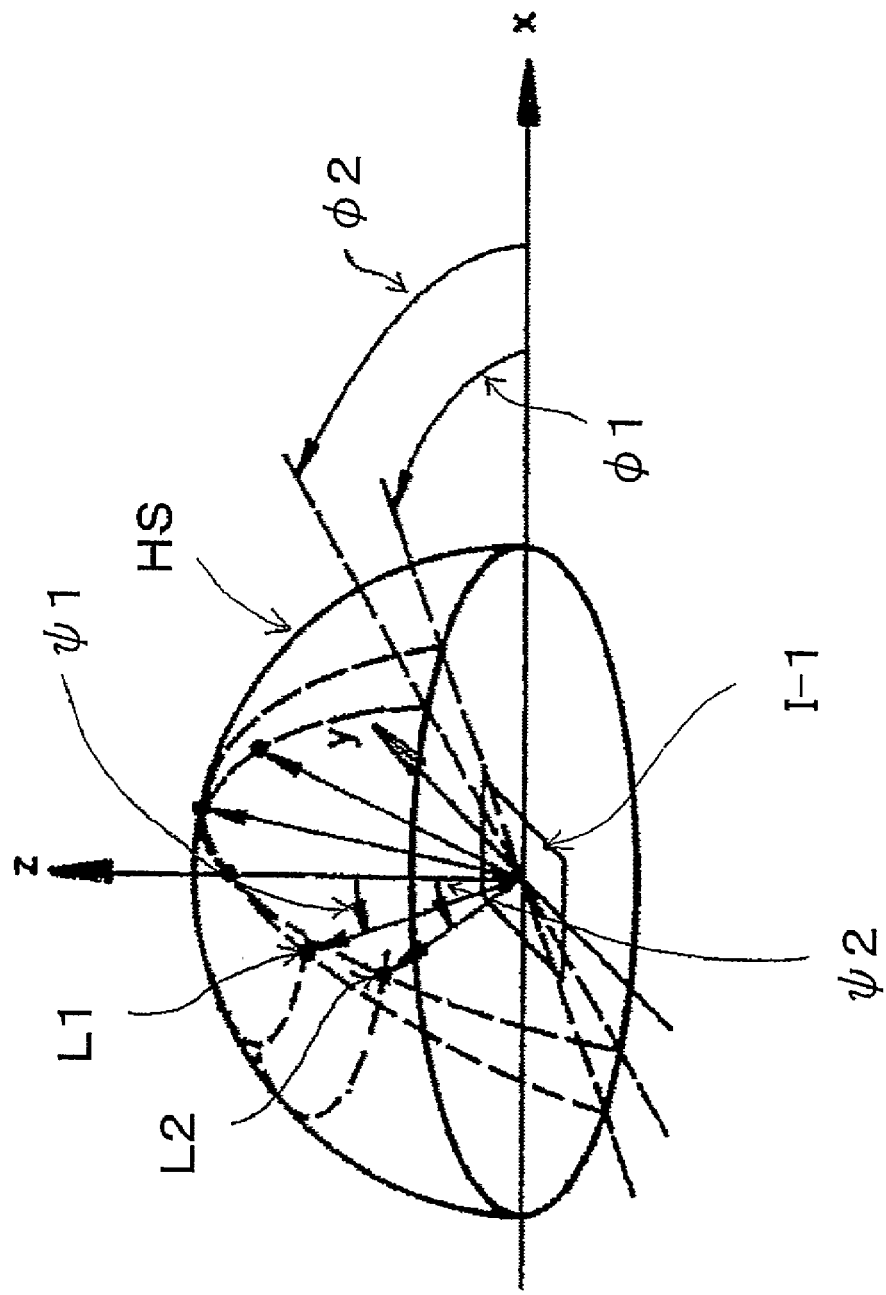
FIG. 5 shows the state that the bright point is moving depending on the diffraction lattice area.

The bright points of the respective diffraction lattice areas K1 . . . Kn are determined by the orientation angles and the diffraction angles of diffraction lattices. For example, the case that a diffraction lattice area K1 has an orientation angle $\phi1$ and a diffraction angle $\psi1$ and a adjoining diffraction lattice area K2 has an orientation angle $\phi2$ and a diffraction angle $\psi2$ when light comes in at a predetermined angle will be described. As shown in FIG. 5, when a first image I-1 is rotated on an XY plane, the bright point in relation to a hemisphere HS is shifted to a bright point L2 of the diffraction lattice area K2 from a bright point L1 of the diffraction lattice area K1. Accordingly, a plurality kinds of diffraction lattice patterns 5 having the respective diffraction lattice areas K1 . . . Kn whose bright points have orientation angles and diffraction angles so as to draw a desired shape on the hemisphere HS may be selected. The diffraction angles are determined based on the diffraction lattice pitches and alteration of the bright points can be obtained in the perpendicular direction by changing the diffraction angles.

Figure 6:
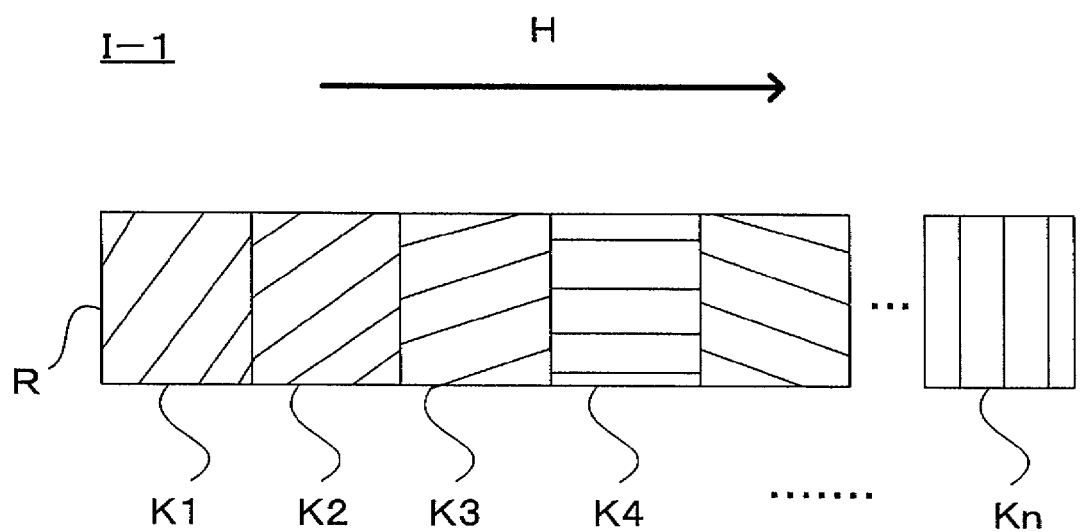
FIG. 6 shows one example of the first image body formed by the apparatus shown in FIG. 3.

Hereinafter, while exemplifying the first image I-1 shown in FIG. 6 as an image body giving a moving image, its formation method will be described. In the formation method, relief pattern sheets 6 having diffraction lattice patterns as the relief patterns 5 are used. Hereinafter, the relief patterns 5 are called as the diffraction lattice patterns 5 in the formation method. The first image body I-1 is composed as a diffraction lattice row R of a plurality of diffraction lattice areas K1 . . . Kn with different orientation angles, which adjoin each other in the predetermined direction H.

Figure 7:
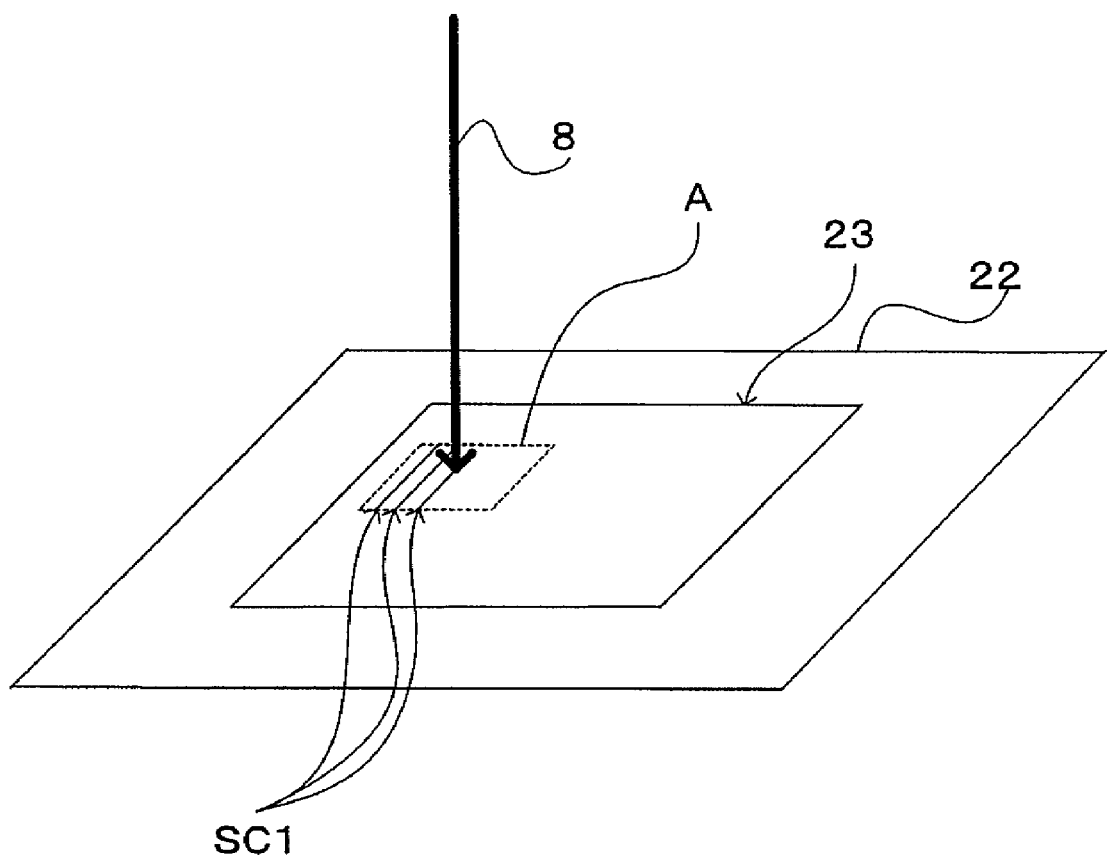
FIG. 7 shows the state that the image body shown in FIG. 6 is formed by the apparatus shown in FIG. 3.

Next, based on the diffraction lattice patterns selected in the above-mentioned manner, a method for forming the diffraction lattice row R will be described practically along with FIG. 7. First, a relief pattern sheet 6 having the diffraction lattice pattern 5 corresponding to the diffraction lattice area K1 and a relief formation material 3 are closely attached to obtain a laminate 23 in the above-mentioned manner and the laminate 23 is disposed on a predetermined position of an XY stage 22. Successively, the photothermal conversion layer 7 is irradiated with light 8 so as to form the diffraction lattice pattern 5 on the region A of the relief formation layer 2 where the diffraction lattice area K1 is to be formed.

When light 8 is moved in the area A so as to draw scan lines SC1 at predetermined pitches, the diffraction lattice pattern 5 is formed only in the area A and as a result, the diffraction lattice area K1 is formed in the area A where the area K1 is to be formed. The scanning lines SC1 are made visible for making the explanation easily understandable, and therefore, they are not actually observed with the naked eye. The irradiation starting position and the irradiation pattern of the light 8 may be controlled by control with PC 24. With respect to other diffraction lattice areas K2 . . . Kn respectively, in the same manner as that in the case of the diffraction lattice area K1, the corresponding diffraction lattice patterns 5 may be formed in regions where the diffraction lattice patterns 5 are to be formed so as to make the areas K2 . . . Kn adjoining in the predetermined direction H.

The irradiation starting positions and the irradiation patterns of the light rays 8 in relation to the respective diffraction lattice areas K1 . . . Kn to be formed may be controlled by the PC 24. By the above-mentioned method, the diffraction lattice row R is formed on the relief formation layer 2. The obtained relief formation material 3 may be further processed properly to obtain the first image body I-1 of a moving image. The control of light irradiation such as the irradiation pitches, irradiation intensity, and moving speed corresponding to the formation of the respective diffraction lattice areas K1 . . . Kn may be carried out by previously set the respective values for the control and performed by the PC 24. The formation order of the respective diffraction lattice areas K1 . . . Kn is optional.

In this embodiment, the sizes of the respective diffraction lattice areas K1. Kn are same, however they may be different by areas. The predetermined direction H is not necessarily straight, and can be bent at predetermined angles, spiral, or curved. The diffraction lattice row R formed in the first image I-1 is not necessarily single, and a plurality of rows may be formed.

Further, a plurality of relief pattern sheets 6 are made ready while each of the relief patterns 5 being made different from one another and a plurality of the relief patterns 5 are combined so as to compose one generatrix assembly, and the respective generatrices of a plurality of relief patterns 5 may be formed on the relief formation layer 2 so as to observe images corresponding to respective characteristics of each of the plurality of relief patterns 5 by combining a plurality of the generatrix assemblies.

Accordingly, an image body containing images corresponding to respective characteristics of a plurality of the relief patterns 5 can be obtained in a single plane. The characteristics of the relief patterns 5 may include images obtained owing to the light interference and the directions in which the images are observed. One generatrix assembly is preferably small enough not to be seen with the naked eye and according to the invention using light, fine interference fringes can be formed. Therefore, the invention is applicable in the case the kinds of relief patterns 5 contained in the generatrix assembly of a predetermined size increase.

Hereinafter, using a second image body I-2 as an image body in which different images can be observed depending on observation direction when it is observed from different observation directions, its formation method will be described. In the formation method, a relief pattern sheet 6 having hologram patterns as the relief patterns 5 will be used. Hereinafter, the relief patterns 5 in this formation method are called as hologram patterns 5.

Figure 8:
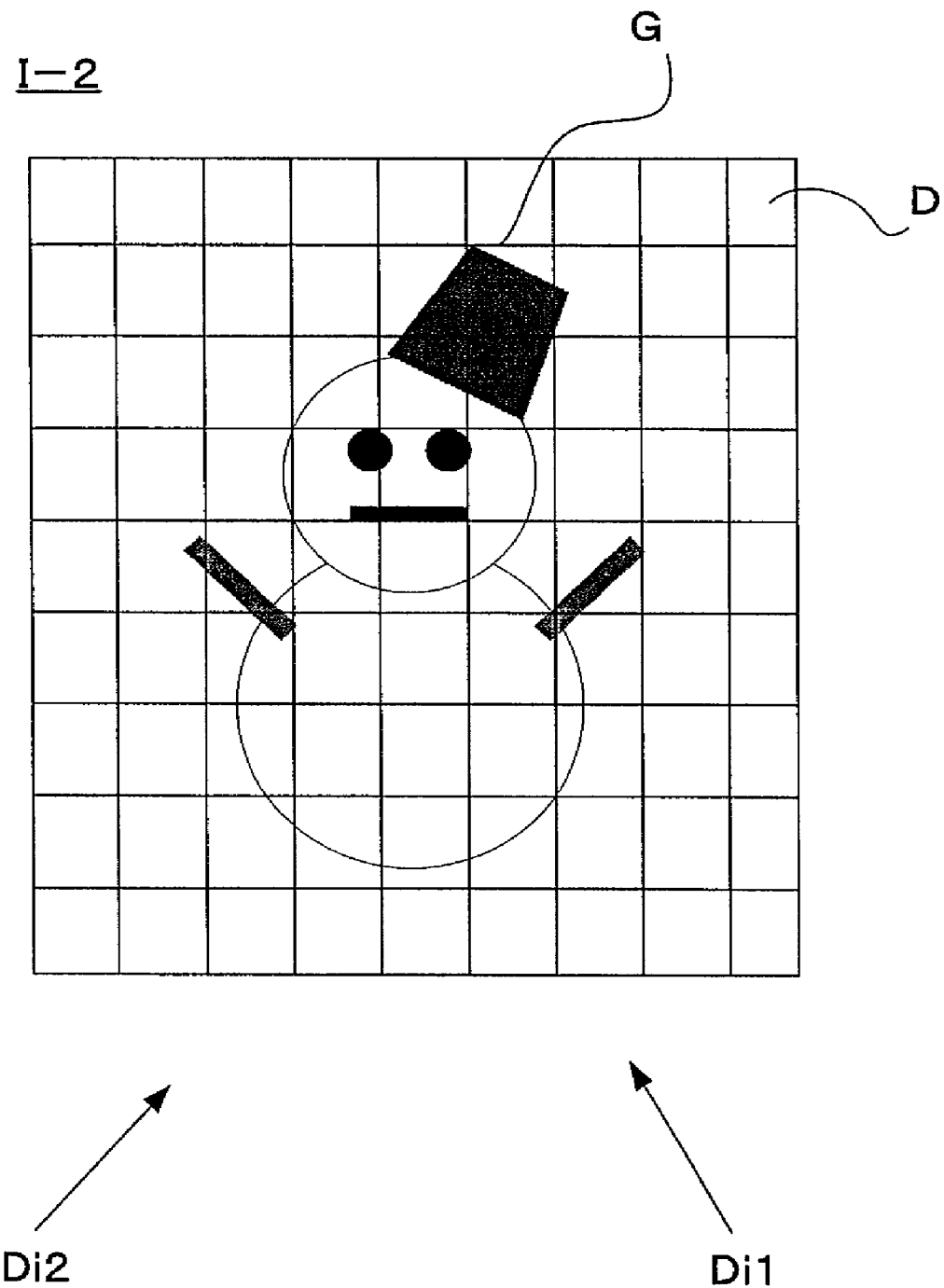
FIG. 8 shows one example of the second image body formed by the apparatus shown in FIG. 3.
Figure 9:
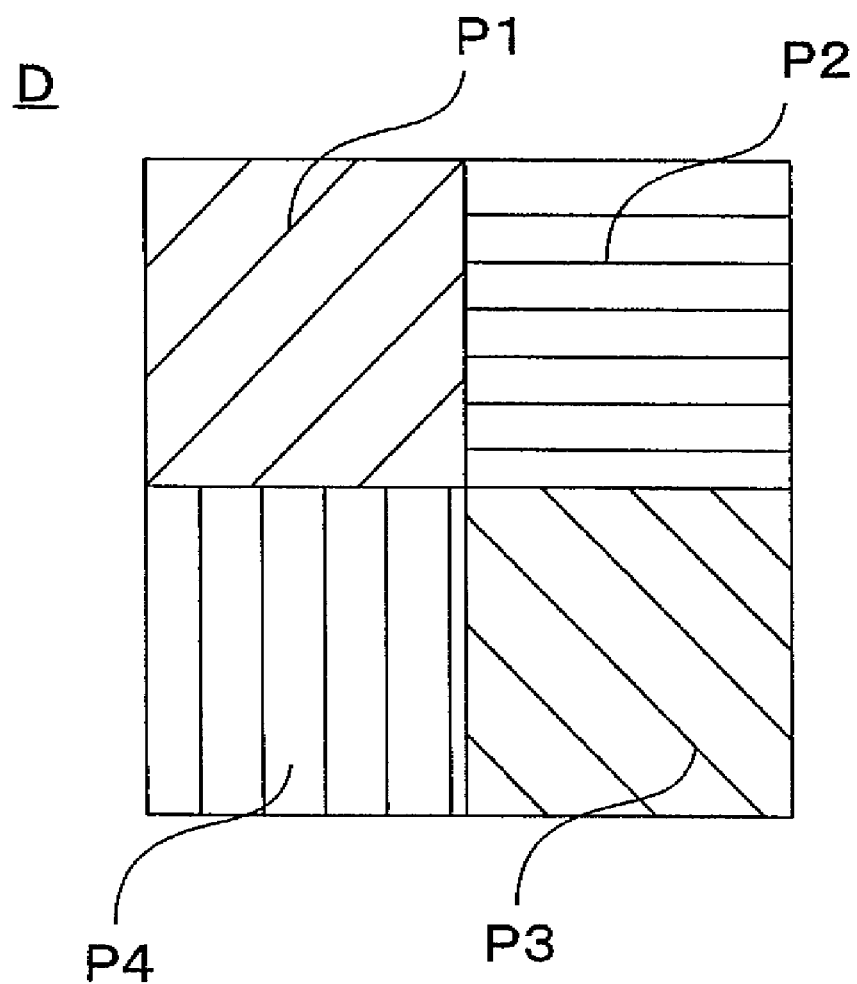
FIG. 9 shows a plurality of generatric regions contained in one divided region.

In this embodiment, a second image body I-2 in which four type images are observed from four observation directions will be described. As shown in FIG. 8, if the second image body I-2 is divided into divided divisions D as a plurality of generatrix assemblies, as shown in FIG. 9, the respective divided divisions D are composed of four generatrix portions P1 to P4. Hereinafter, if it is no need to particularly distinguish the generatrix portions P1 to P4, they are called simply generatrix portions P. The boundaries of the respective divided divisions D of FIG. 8 and the boundaries of the respective generatrix portions P of FIG. 9 are made visible only for making the explanation easily understandable and not practically observable lines. Further, it is preferably the divided divisions D are small enough not to be observed.

Different kind of hologram patterns 5 from each other is formed in the respective generatrix portions P1 to P4 and each of the generatrix portions P1 to P4 functions as a generatrix, so that images corresponding to the characteristics of the respective hologram patterns 5 can be observed in the respective observation directions. For example, in the observation direction Di1 corresponding to the generatrix portion P1, an image G shown in FIG. 8 can be observed and in the observation direction Di2 corresponding to the generatrix portion P2, another image can be observed. Similarly, with respect to the generatrix portion P3 and the generatrix portion P4, an image different from those of other generatrix portions can be observed in a different observation direction from those of other generatrix portions. Accordingly, to form the second image body I-2, first hologram patterns 5 to express the respectively different images and to have respectively different observation directions are selected and each of the hologram patterns 5 is corresponded with each of the generatrix portions P1 to P4 in 1 to 1 relation.

Figure 10:
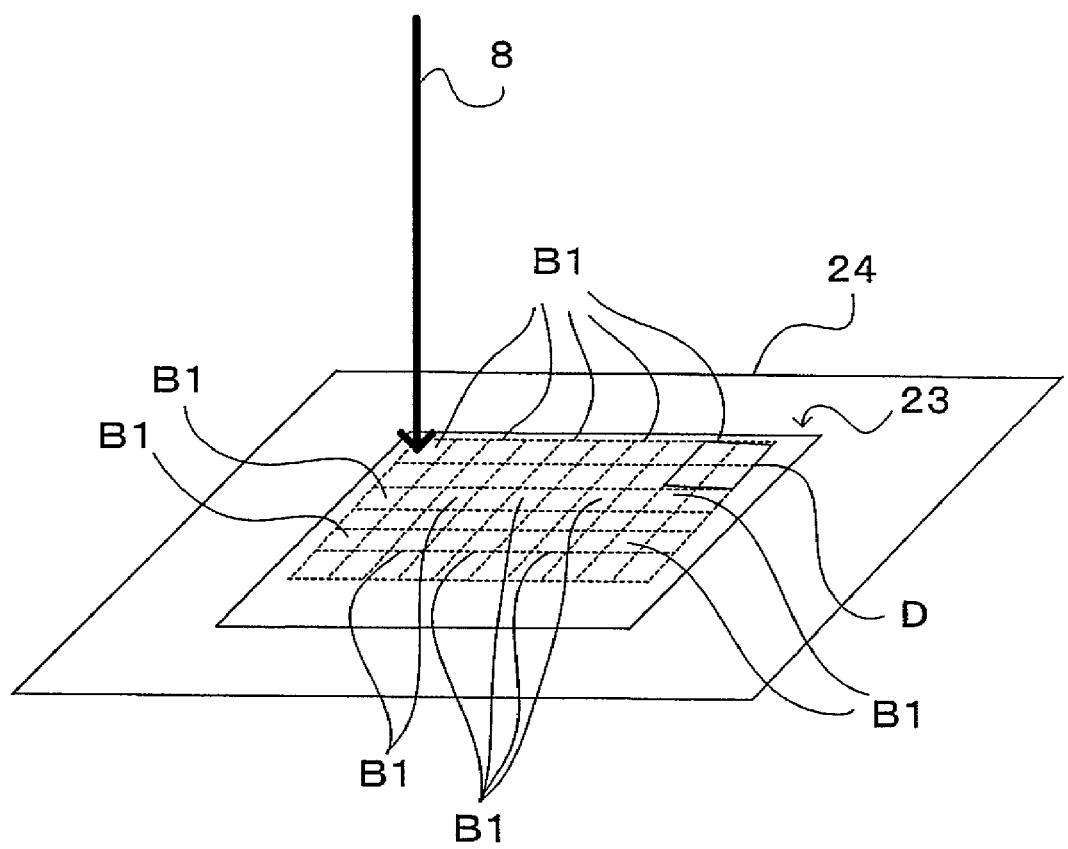
FIG. 10 shows the state that the image body shown in FIG. 8 is formed by the apparatus shown in FIG. 3.
Figure 11:
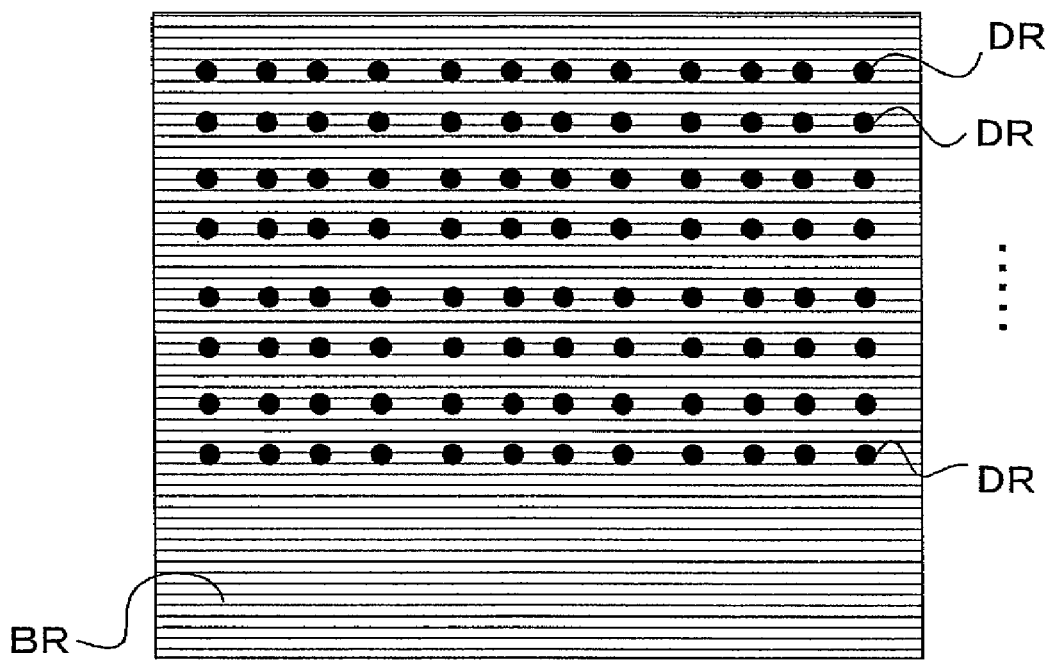
FIG. 11 shows the third image body formed by the apparatus shown in FIG. 3.

Next, the formation method for the second image body I-2 based on the four type hologram patterns selected in the above-mentioned manner will be described more practically with reference to FIG. 10. First, a method for forming hologram patterns 5 expressing the image G in the observation direction Di1 in the generatrix portion P1 will be described. A relief pattern sheet 6 having the hologram patterns 5 and a relief formation material 3 are closely attached in the above-mentioned manner to obtain a laminate 23 and the laminate 23 is set at a predetermined position of the XY stage 22. Next, the photothermal conversion layer 7 is irradiated with light 8 so as to form the hologram patterns 5 only in the areas B1 . . . B1 of the relief formation layer 2 where the generatrix portion P1 is to be formed.

The areas B1 . . . B1 (slanting line part) where the generatrix portion P1 is to be formed are obtained by dividing the pattern formation region PR into divided divisions D and defining the areas corresponding to the generatrix portion P1 in the respective divided divisions D as the areas B1. The pattern formation region PR is the region corresponding to the second image body I-2. For example, when the respective areas B1 are scanned at predetermined pitches with light 8, only the hologram patterns 5 corresponding to the respective areas B1 are formed on the relief formation layer 2 and as a result, the generatrix portion P1 functioning as a generatrix of the hologram patterns 5 is formed in the areas B1. The irradiation position and the irradiation pattern of the light 8 may be previously programmed and controlled by the PC 24.

The respective areas B1 are shown to be big enough to be observed for explanation easiness but they are actually so small not to be observed with the naked eye. With respect to other respective generatrix portions P2 to P4, in the same manner as the case of generatrix portion P1, pattern formation should be carried out in the regions where the generatrix portions P of the hologram patterns 5 are to be formed by using relief pattern sheets 6 of the hologram patterns 5 corresponding to the respective generatrix portions P2 to P4. The irradiation position and the irradiation patterns of light 8 in relation to each of the regions, where the corresponding generatrix portion P is to be formed, may be controlled by the PC 24. By the above-mentioned method, the respective hologram patterns 5 are formed in all of the generatrix portions P. If necessary, the obtained relief formation material 3 may be processed further to obtain the second image body I-2.

In this embodiment, the second image body I-2 in which four type holograms are expressed by dividing the region into four divided divisions D is formed, however the number of the generatrix portions to be included in one divided division D is not particularly limited if it is 2 or higher. In this case, the plural kinds of the hologram patterns 5 which are equal to the number of the divided generatrix portions are used for the formation. Further, in FIG. 9, the respective hologram patterns 5 are formed in the entire body of the respective generatrix portions, however depending on the images to be formed in the respective generatrix portions P, the hologram patterns 5 are formed only partially in the generatrix portions P in some cases. Also, as the plural relief patterns 5, respective diffraction lattice patterns 5 each corresponding to three primary colors are made to correspond to the respective generatrix portions P, so that color hologram in specific observation direction can be expressed.

Further, as the relief pattern sheet 6 having the relief patterns 5, a first relief pattern sheet having first relief patterns and a second relief pattern sheet 6 having second relief patterns different from the first relief patterns are made ready and the first and the second relief patterns may be formed in the relief formation layer 2 in such a manner that fine regions where the second relief patterns are formed have shapes so small as not to be observed with the naked eye and assembled in the background region which is formed by using the first relief patterns.

Accordingly, it is made possible to obtain an image body in which the background region formed by using the first diffraction lattice patterns is observed with the naked eye but the shape of each fine region which is formed by using the second relief patterns is not recognized with the naked eye, and the shape is recognized as a point or a line. The fine regions are observed like point or linear patterns on the first diffraction lattice patterns with the naked eye and their shapes are recognized only when they are magnified with a microscope or the like. If the shapes are made to be letters or marks, the obtained image body can be used for security means.

Hereinafter, exemplifying a third image body I-3 as the image body in which the fine regions are assembled in the background region, the formation method for the image body will be described. In the formation method, a relief pattern sheet 6 having diffraction lattice patterns as the relief patterns 5 is used. Hereinafter, in the formation method, the relief patterns 5 are called as diffraction lattice patterns 5.

Figure 12:
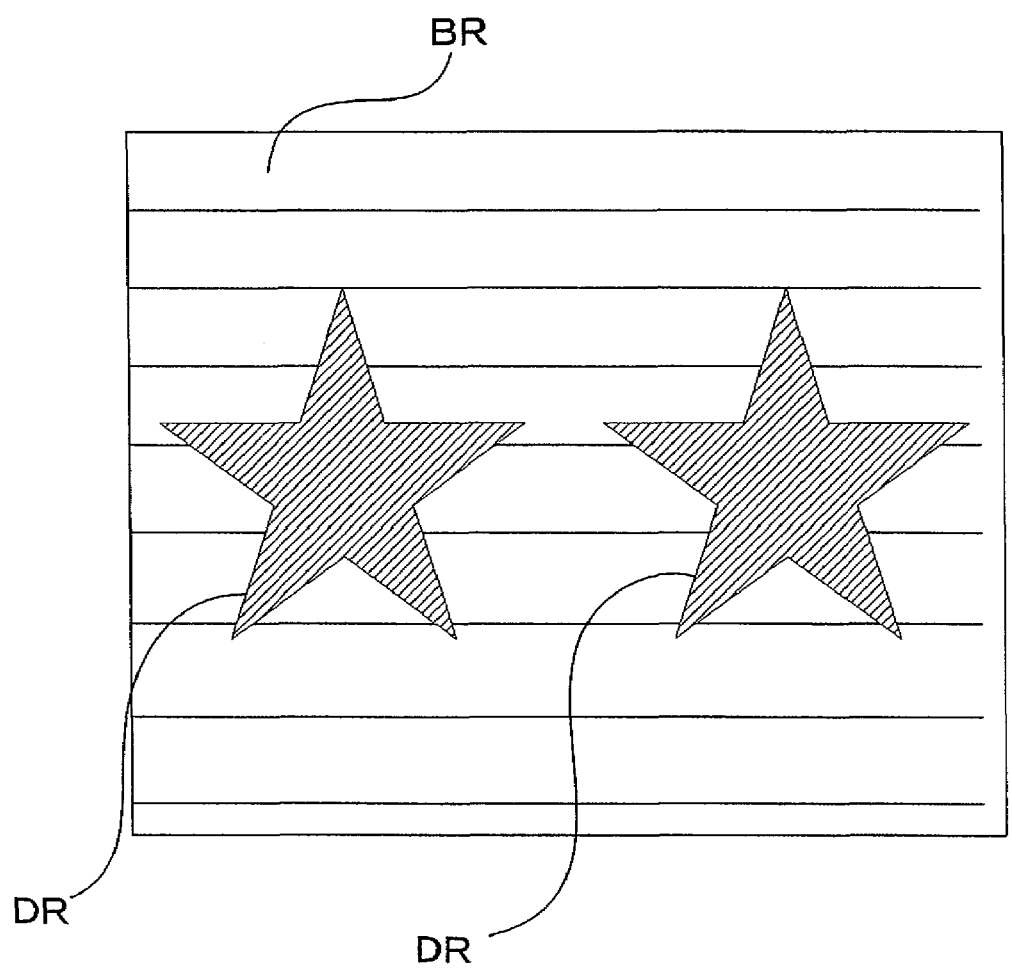
FIG. 12 is a magnified diagram of the third image body shown in FIG. 11.

The third image body I-3 is composed of the background region BR in which first diffraction lattice patterns are formed and a plurality of fine regions DR . . . DR seemed to be points assembled in the background region BR when observed with the naked eye. The respective fine regions DR looking like only points with the naked eye are formed to be in star shape by the second diffraction lattice patterns different from the first diffraction lattice patterns as shown in FIG. 12. The shapes of the fine regions DR are recognized only when they are magnified with a microscope or the like. Hereinafter, the formation method for the third image body I-3 will be described more particularly along with FIG. 13 and FIG. 14.

Figure 13:
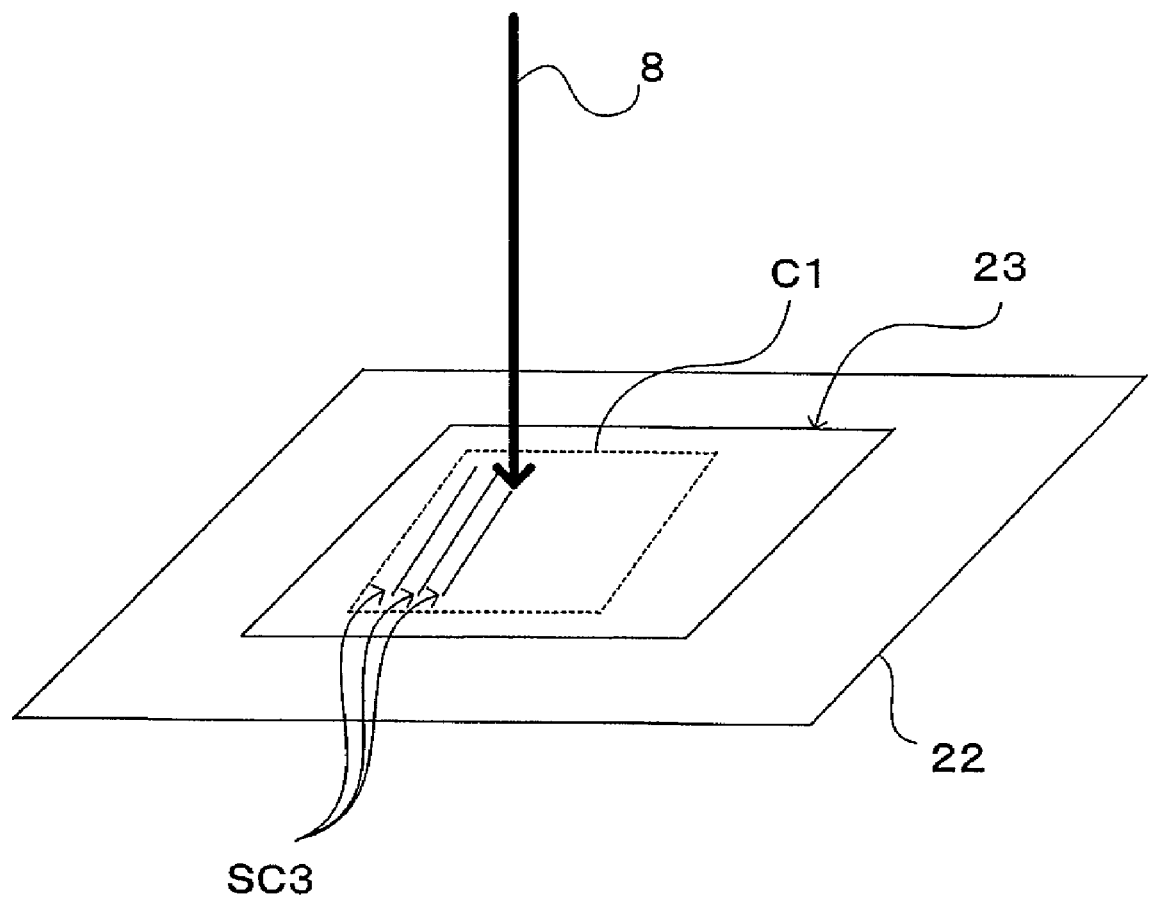
FIG. 13 shows the state that the background region is formed by the apparatus shown in FIG. 3.

First, as shown in FIG. 13, the first relief pattern sheet 6 having the first diffraction lattice patterns 5 to be formed in the background region BR and a relief formation material 3 are closely attached in the above-mentioned manner to obtain a laminate 23 and the laminate 23 is set at a predetermined position of a stage XY stage 22. Successively, the photothermal conversion layer 7 is irradiated with light 8 in such a manner that the first diffraction lattice patterns 5 are formed in the region C1 of the relief formation layer 2 where the background region BR is to be formed.

For example, in the region C1 where the background region BR is to be formed, when the light 8 is moved so as to draw scanning lines SC3 at predetermined pitches, the first diffraction lattice patterns 5 are formed in the region C1 and accordingly, the background region BR is formed in the region C1. The background region BR may be formed in such matter that formation of the first diffraction lattice patterns 5 is avoided in the region where formation of the second diffraction lattice patterns 5 is carried out. The irradiation position and the irradiation patterns of the light 8 are controlled by the PC 24. The scanning lines SC3 of the light are shown only for the explanation and they are not actually observed with the naked eye.

Figure 14:
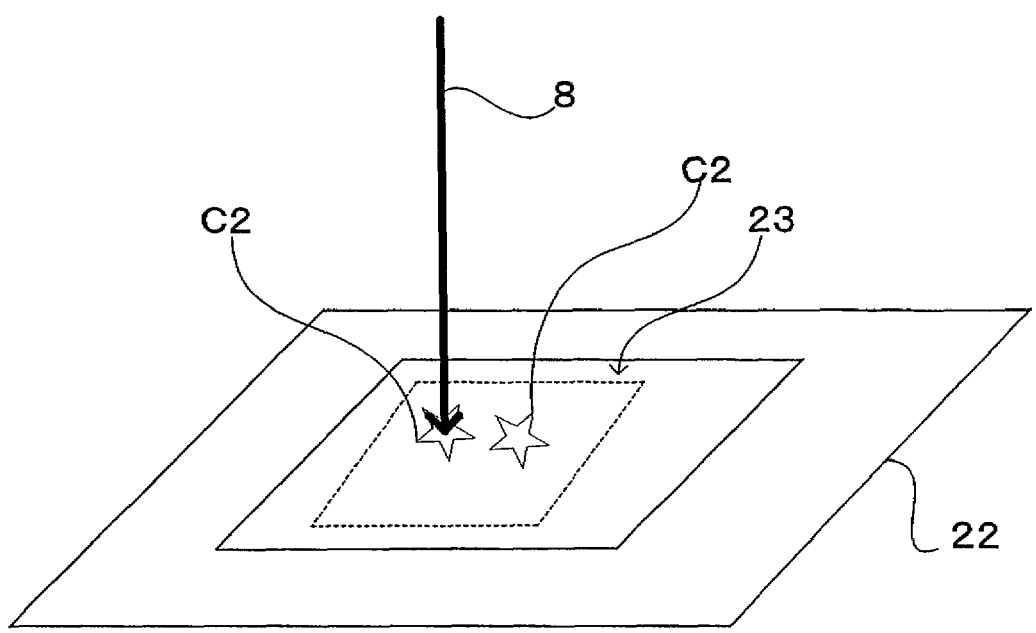
FIG. 14 shows the state that fine regions are formed by the apparatus shown in FIG. 3.

Next, the first relief pattern sheet 6 is separated from the relief formation material 3 and as shown in FIG. 14, the second relief pattern sheet 6 having the second diffraction lattice patterns 5 and the relief formation material 3 are closely attached to each other in the above-mentioned manner to obtain a laminate 23 and the laminate 23 is put at a predetermined position of the XY stage 22. Successively, the photothermal conversion layer 7 is irradiated with light 8 in such a manner that the second diffraction lattice patterns 5 are formed in the regions C2 . . . C2 where the fine regions BR of the relief formation layer 2 are to be formed.

For example, if light 8 is scanned at predetermined pitches in one region C2, the second diffraction lattice patterns 5 are formed in the region C2 and as a result, fine regions DR are formed in the region where they are to be formed. The irradiation position and the irradiation pattern of the light 8 may be controlled by the PC 24. Each region C2 is shown with a size observed with the naked eye for explanation convenience, but it does not have a size large enough to be recognized. Further, the boundary lines of each region C2 are also shown for explanation convenience, but they are not observable with eye. By the above-mentioned method, the background region BR and fine regions DR are formed in the relief formation layer 2. The third image body I-3 can be obtained by processing properly the obtained relief formation material 3.

In this embodiment, the shapes formed by the second diffraction lattice patterns have star form, but the shape is not limited to the star, and can be letters or designed patters. The respective relief patterns to be used for the background region BR and the fine regions DR should be different and are not limited to the diffraction lattice patterns.

In this embodiment, the laminate 23 is set on the XY stage at the time of formation of the first to the third image bodies I-1 to I-3, but it may be attached to a side face of a drum by vacuum adsorption. In such a case, the perpendicular direction is controlled by rotation of the drum and the horizontal direction may be controlled by moving the laser head 21 of the light 8 in the horizontal direction. In this embodiment, although the photothermal conversion layer 7 is formed independently, if a substance increasing the photothermal conversion efficiency is added to any layer of either the relief formation material 3 or the relief pattern sheet 6, it is not necessarily required to form the photothermal conversion layer 7.

If relief pattern sheets 6 having the first image body I-1, the second image body I-2, or the third image body I-3 obtained in the above-mentioned formation method as a master hologram is used and irradiation of the light 8 is controlled so as to form all of the concavo-convex patterns of the respective image bodies, the respective image bodies can easily be copied.

Figure 15:
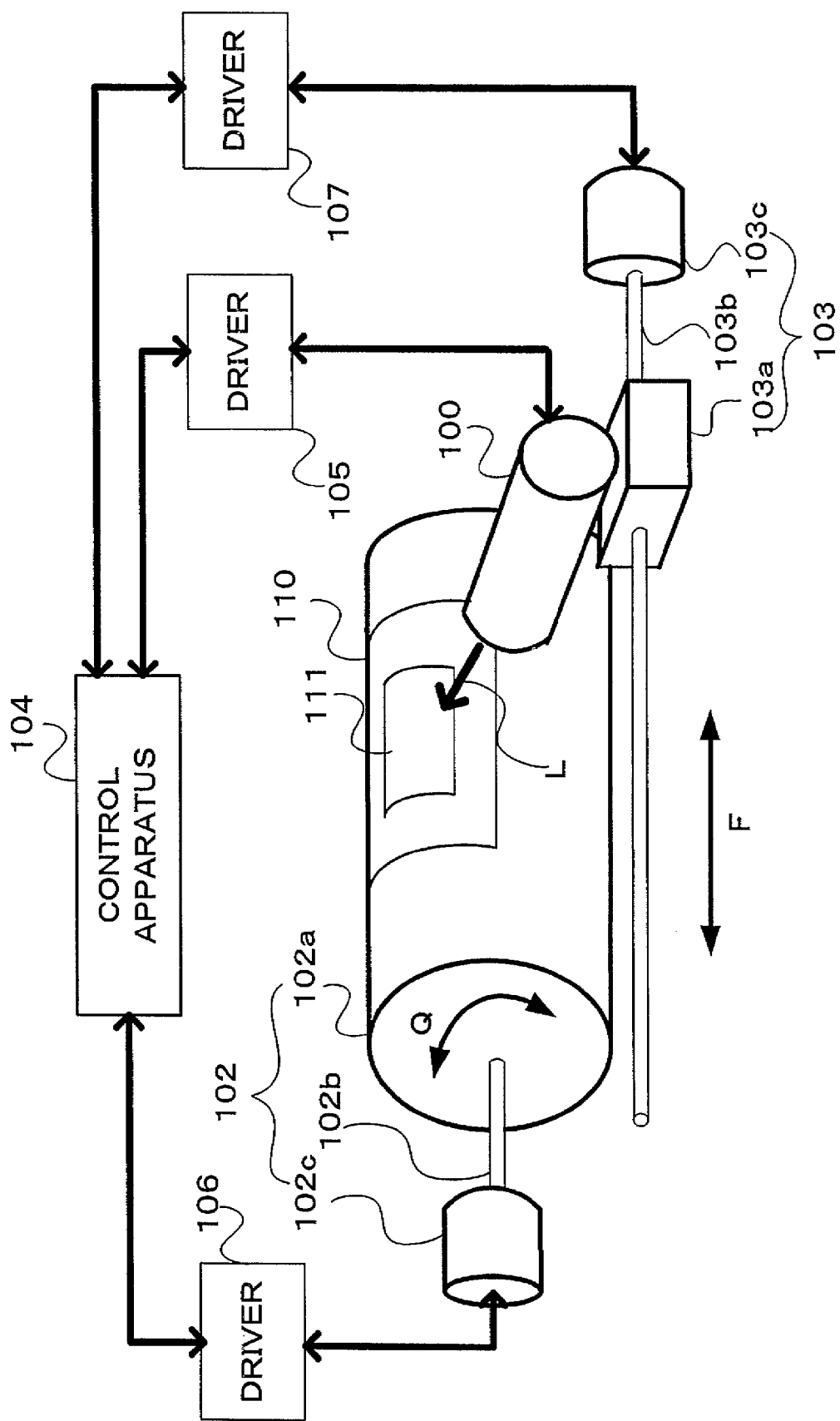
FIG. 15 shows an optical diffraction structure production apparatus to be used an embodiment for executing a method for producing an optical diffraction structure and a method for copying an optical diffraction structure for the invention.

Next, an embodiment of execution of hologram copying method and method for producing an optical diffraction structure according to the invention will be described. FIG. 15 shows an optical diffraction structure production apparatus to be used in the embodiment. In the optical diffraction structure production apparatus, a laser irradiation apparatus 100 for irradiating somewhere with IR laser L as energy beam, a drum apparatus 102 for holding a master hologram, and a transportation apparatus 103 are connected to a control apparatus 104 for controlling the operation of the above-mentioned apparatuses through drivers 105, 106, and 107 respectively.

The drum apparatus 102 is provided with a column type drum 102a and a motor 102c for rotating the drum 102a on the axis 102b in the direction Q. Numberless small holes are formed in the entire outer circumferential face of the drum 102a and the air in the inside of the drum 102a is sucked by a suction pump not illustrated, so that negative pressure is generated in the inside of the drum 102a to attach a master hologram 110 and a film 111 for hologram formation to the surface of the drum 102a. The respective structures of the master hologram 110 and the film 111 for hologram formation will be described later.

The transportation apparatus 103 is provided with a transportation part 103 and a motor 103c for moving the transportation part 103a in the direction parallel to the axial direction of the drum 102a, that is in the direction shown as the arrow F, by a rail1 103b. Since the laser irradiation apparatus 100 is set on the transportation part 103a, along with the transportation of the transportation part 103a, the laser irradiation apparatus 100 can move in parallel to the side face of the drum 102a.

The laser irradiation apparatus 100 irradiates the master hologram 110 attached to the side face of the drum 102a with IR laser L. The irradiation range of the IR laser L in the master hologram 110 can be shifted by the parallel movement of the laser irradiation apparatus 100 by the above-mentioned transportation apparatus 103 and rotation of the drum 102a.

The control apparatus 104 is composed to be a computer comprising a CPU and various peripheral circuits such RAM and ROM necessary for the operation of CPU and is employed to control the operations of the above-mentioned laser irradiation apparatus 100, drum apparatus 102, and transportation apparatus 103 according to previously installed programs. Accordingly, shift of the irradiation range of the IR laser L with which the master hologram 110 is irradiated by the laser irradiation apparatus 100 is controlled by the control apparatus 104.

Figure 16:
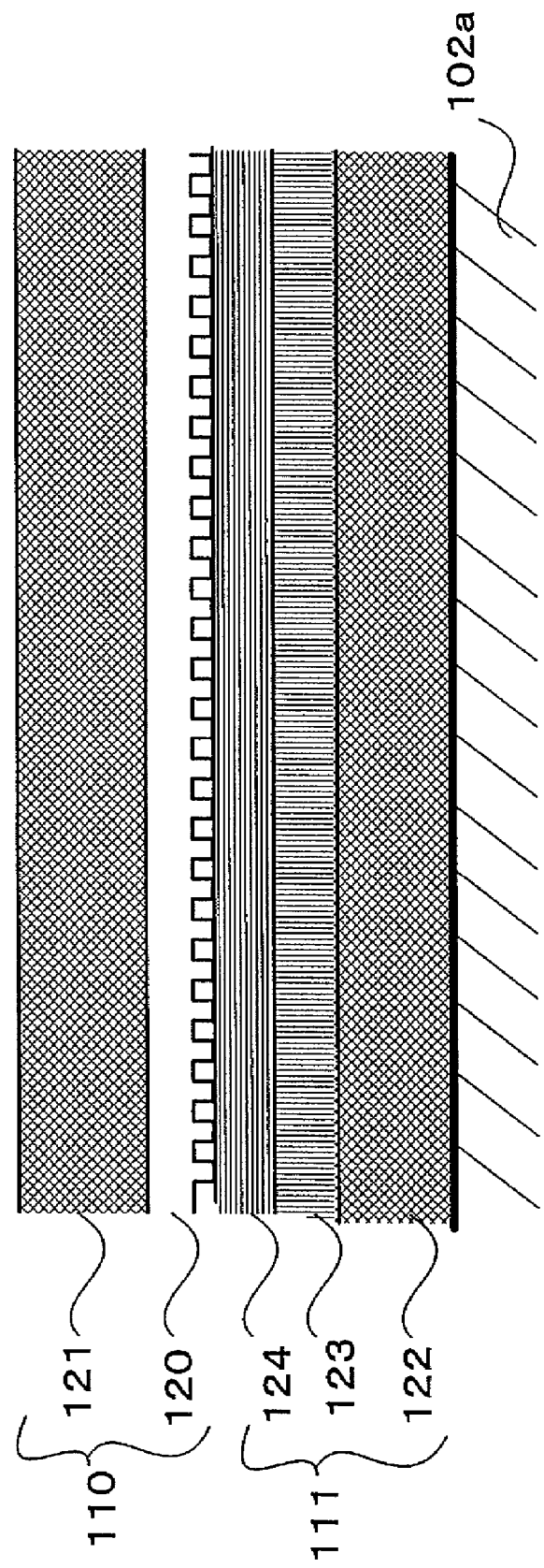
FIG. 16 shows the state that a master hologram to be used in the embodiment of FIG. 15 and a film for forming hologram are laminated.

Next, the structures of the master hologram 110 and the film 11 for hologram formation will be described along with FIG. 16. FIG. 16 shows the state that master hologram 110 and the film 111 for forming hologram to be used in this embodiment are laminated on the outer circumference of the drum 102a. As shown in FIG. 16, the master hologram 110 is provided with a hologram layer 120 in which the interference fringes are formed in concavo-convex form and a base substrate layer 121 of polyethylene terephthalate.

The master hologram 110 can be produced by a conventionally known method. The hologram to be used for the hologram layer 120 may be those which can record hologram information by the concavo-convex form in the material surface and are applicable for a conventional method for copying hologram by using a thermoplastic resin. Practically, holograms based on the Frenel hologram, Fourier transform hologram, Fraunhofer hologram; and the holograms utilizing their principles, such as image hologram, holographic stereogram, and holographic diffraction lattice can be used. In place of the master hologram 110, a diffraction lattice having the concavo-convex patterns evenly formed therein may be used and in this case, the lattice patterns of the diffraction lattice are transferred to the film 111 for forming hologram.

On the other hand, the film 111 for forming hologram is composed by layering a primer layer 123 and a fusion layer 124 on the base substrate layer 122 of polyethylene terephthalate. The fusion layer 124 comprises wax, a thermoplastic resin, and a high heat conversion material as a substance for increasing the conversion efficiency from light energy of IR laser to heat energy. The thermoplastic resin and wax composing the fusion layer 124 may be those which are solid state at a normal temperature. The primer layer 123 functions as a primer for sticking the base substrate layer 122 and the fusion layer 124 to each other.

The principle of the transformation of the concavo-convex form of the hologram layer 120 to the fusion layer 124 by IR laser L will be described with reference to FIG. 17. In FIG. 17, the master hologram 110 and the film 111 for forming hologram are attached to the outer circumference of the drum 102a as described above. the master hologram 110 and the film 111 for forming hologram layered each other is irradiated from the base substrate layer 121 side with the IR laser L moving in the direction shown as the arrow C.

In the fusion layer 124, an irradiation range W1 of the fusion layer 124 is heated by the heat of the IR laser L. When the temperature of the irradiation range W1 of the fusion layer 124 reaches the fusing point, the fusion layer 124 in the range is fused and the interference fringes of the hologram layer 120 in the irradiation range W1 are transferred to the fusion layer 124. Next, the IR laser L is shifted to an irradiation range W2. FIG. 17 shows the state that the interference fringes in the irradiation range W1 are transferred to the fusion layer 124 and the IR laser is shifted to the irradiation range W2.

When the irradiation range of the IR laser L is shifted, the temperature in the transferred range W1 of the fusion layer 124 decreases without a particular cooling process and the fused fusion layer 124 becomes cured. On the other hand, when the new irradiation range W2 in the fusion layer 124 is heated and the temperature of the irradiation range W2 of the fusion layer 124 reaches the fusing point, the fusion layer 124 in the range is fused and the interference fringes of the hologram layer 120 in the irradiation range W2 are transferred to the fusion layer 124. Thereafter, similarly, the interference fringes in the ranges which is irradiated with the IR laser L are successively transferred to the fusion layer 124.

Figure 18A:
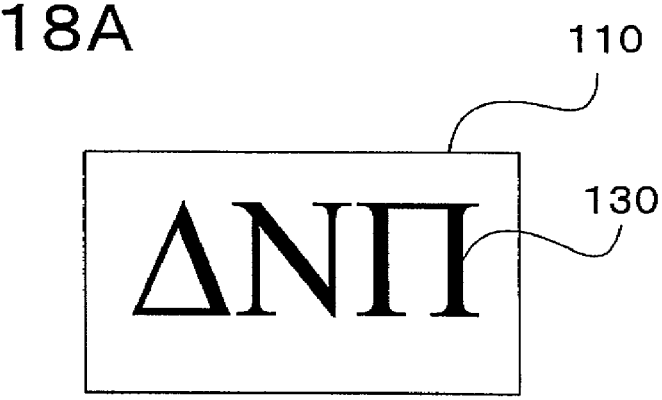
FIG. 18A shows one example of a master hologram to be used in an embodiment shown in FIG. 15.
Figure 18B:
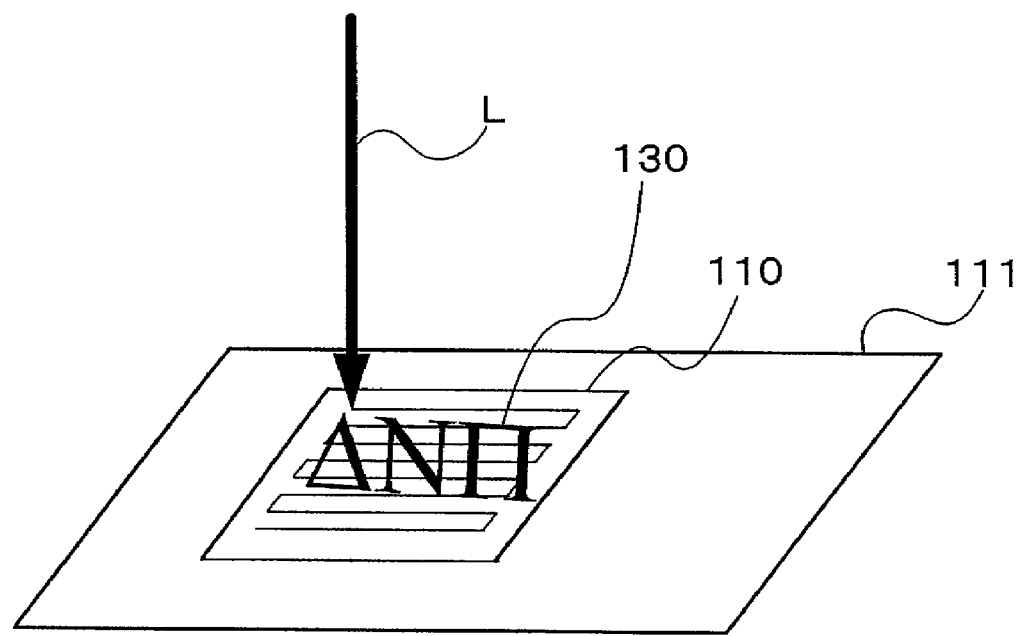
FIG. 18B shows the state that the master hologram shown in FIG. 18A is irradiated with IR laser.
Figure 19A:
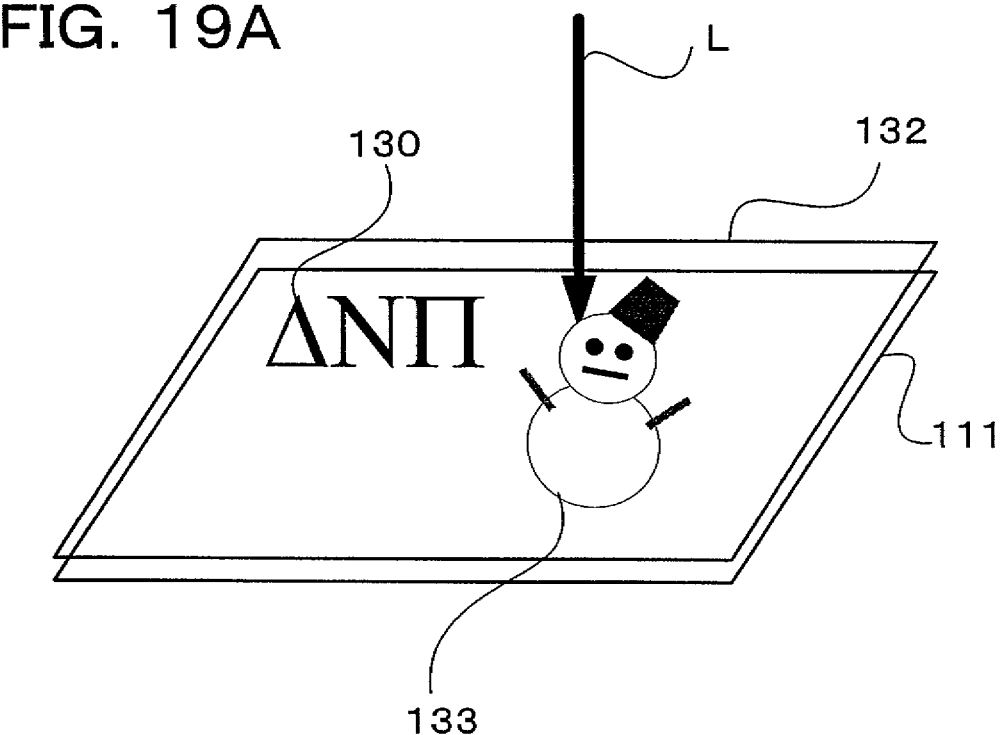
FIG. 19A shows the state that a predetermined shape is drawn by IR laser.
Figure 19B:
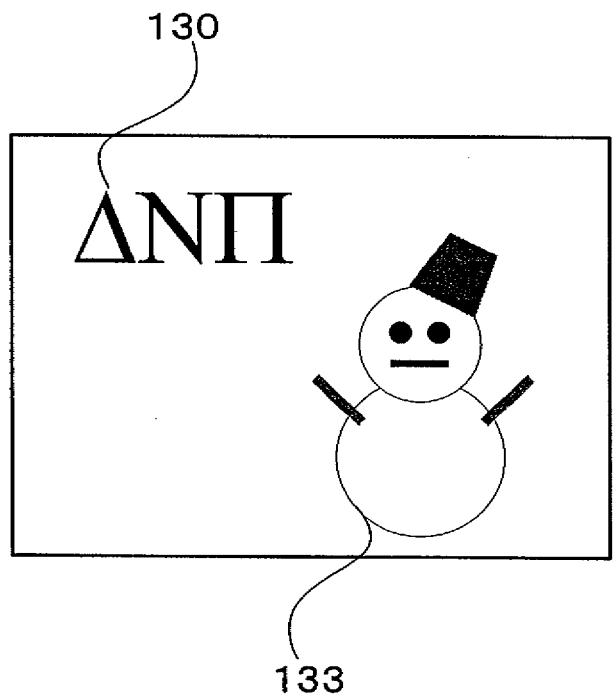
FIG. 19B shows one example of an optical diffraction structure produced in the embodiment of FIG. 15.

Next, the method for producing an optical diffraction structure of the invention will be described practically with reference to FIGS. 18A, 18B, 19A, and 19B. FIG. 19B shows an optical diffraction structure in which the interference fringes for producing a hologram image 130 are combined with a drawn image 133 with a predetermined form drawn by a diffraction lattice. Hereinafter, the method for producing an optical diffraction structure by the invention will be described. The method for producing an optical diffraction structure of the invention comprises a hologram copying process and a diffraction lattice drawing process. The order of these two processes is optional. In this embodiment, the copying process is carried out previously and the drawing process later.

First, the copying process will be described. FIG. 18A shows a master hologram 110 in which the interference fringes for producing the hologram image 130 to be copied on the film 111 for forming hologram are provided. The object range to be copied in this embodiment is the entire interference fringes formed in the master hologram 110. The film 111 for forming hologram is stuck to the outer circumferential face of the drum 102a of the optical diffraction structure production apparatus (FIG. 15) and the master hologram 110 is layered thereon. As described above, negative pressure is generated in the inside of the drum 102a, so that the pressure in the inside of the drum 102a is lower than the pressure in the outside and therefore, the film 111 for forming hologram and the master hologram 110 layered on the drum 102a are attracted to the outer circumference of the drum 102a. In FIG. 18B, the master hologram 110 is smaller than the film 111 for forming hologram, however it is sufficient if the film 111 for forming hologram has the size such that the object range to be copied of the master hologram 11 can be transferred to the film 11 for forming hologram.

Next, as shown in FIG. 18B, as tracing the interference fringes of the master hologram 110, the master hologram 110 is irradiated with IR laser L. In the operation, the irradiation position of the IR laser L is controlled by the program taken in the control apparatus 104. That is, the operation is executed by controlling the operations of drum apparatus 102 and the transportation apparatus 103. With the shift of the irradiation position, the interference fringes for producing the hologram image 130 are transferred to the fusion layer 124 of the film 111 for forming hologram. In such a manner, since the master hologram 110 in which the hologram image 130 is previously formed is easily transferred by IR laser L, even if the hologram image 130 is complicated, the hologram image can be copied easily by IR laser L within a short time.

Next, the drawing process will be described. In place of the master hologram 110, a diffraction lattice 132 is layered on the film 111 for forming hologram to which the hologram image 130 has been transferred. The diffraction lattice 132 has constant concavo-convex patterns formed evenly. In this embodiment, the diffraction lattice 132 having the layered structure similarly to the master hologram 110 and having constant concavo-convex patterns formed evenly in the layer corresponding to the hologram layer 120 is used. Next, when the irradiation starting position of the IR laser L is set at a point where the drawing image 133 is to be drawn and an instruction of the image to be drawn is given to the control apparatus 104, the operations of the drum apparatus 102 and the transportation apparatus 103 are controlled according to the program taken in the control apparatus 104 to shift the irradiation position. Further, the irradiation of the IR laser L is repeatedly turned on or off so as to draw the drawing image 133. FIG. 19A shows the state that the drawing image 133 is drawn by the IR laser L. The concavo-convex patterns of the diffraction lattice to be transferred in the drawing process are not a hologram in a strict definition, however the film 111 for forming hologram to be used in the copying process is used as it is.

In the above-mentioned copying process and drawing process, as shown in FIG. 19B, the optical diffraction structure in which the hologram image 130 and the drawing image 133 are combined on the film 111 for forming hologram can be produced. Accordingly, it is made easy to produce a hologram synthesized employee badge comprising the hologram image 130 as a company mark and the drawing image 133 as the face of the employee, or to produce hologram synthesized photograph having cubic background if the hologram image 130 is the cubic background and the drawing image 133 is a face of a man.

The following description is a method for producing an optical diffraction structure having deep depth feeling by making another diffraction lattice 132 ready which has a focused image of the interference fringes at a position different from the focused image position of the interference fringes of the diffraction lattice 132 in the depth direction and transferring the interference fringes of the another diffraction lattice 132 to the fusion layer 124. Normally, though a dry plate, which is an object to be photographed, is set at a position where the interference fringes are focused to form an image (hereinafter, referred to as a focusing position) in the case the diffraction lattice is produced by interference fringes of laser beam with 2 or more luminous fluxes, the another diffraction lattice 132 can be obtained by photographing the dry plate at a position shifted in the horizontal direction from the focusing position (e.g. the position shifted from the focusing position by −4 mm, −2 mm, +2 mm or +4 mm in the horizontal direction).

For example, the another diffraction lattice 132 is produced by setting the dry plate at the position shifted from the focusing position by −4 mm and by the procedure same as that for drawing the drawing image 133 as the first predetermined shape by the diffraction lattice 132 in the above-mentioned drawing process, the second predetermined shape to be the background of the drawing image 133 is drawn on the film 111 for forming hologram by the another diffraction lattice 132. Accordingly, when the hologram image 130 is made as a company mark and the drawing image 133 drawn by the diffraction lattice 132 produced by the above-mentioned normal production method is made as a face of an employee, an apparent distance can be generated between the face of the employee and the background and thus a cubic image expression can be formed in the produced optical diffraction structure.

The hologram copying method and the method for producing an optical diffraction structure for the invention are not limited to the above-mentioned embodiment and may be carried out in variously modified states. For example r in the above-mentioned embodiment, IR laser L is used as the energy beam, electron beam and x-ray may be used. In such a case, a film 111 for forming hologram having a fusion layer 124 generating heat by using the energy beam may be used properly. The speed of the shifting the irradiation range of the IR laser L, electron beam or the like may properly be set to a proper speed at which the hologram and the diffraction lattice can be transferred without any particular cooling process, on the basis of the composing materials of the master hologram 110 and the film 111 for forming hologram and the irradiation range.

Other than the above-mentioned polyethylene terephthalate, any material with which the invention is performed can be used for the base substrate layer 121 of the master hologram 110 and the base substrate layer 122 of the film 111 for forming hologram. The mixing ratio of the substances composing the respective layers is properly changeable to the extent that the invention can be executed with the constitution substances. Further, in this embodiment, the master hologram 110 and the film 111 for forming hologram are layered by generating the negative pressure inside of the drum 102a, the mutually layered master hologram 110 and film 111 for forming hologram may be pressurized from both sides. The master holograms 110 and diffraction lattices 132 are made ready for the respective colors R, G, and B and copying may be carried out for the respective colors.

Next, an embodiment of the method for copying an optical diffraction structure for the invention will be described. In this embodiment, using the optical diffraction structure copying apparatus shown in FIG. 15, the concavo-convex patterns of the optical diffraction structure master-hologram having the same constitution as that of the master hologram 110 shown in FIG. 16 are transferred to a transfer medium having the same constitution as that of the film 111 for forming hologram. Accordingly, descriptions relevant to the optical diffraction structure copying apparatus, the master hologram 110, and the film 111 for forming hologram in this embodiment are as described and therefore, they are not repeated.

Figure 20:
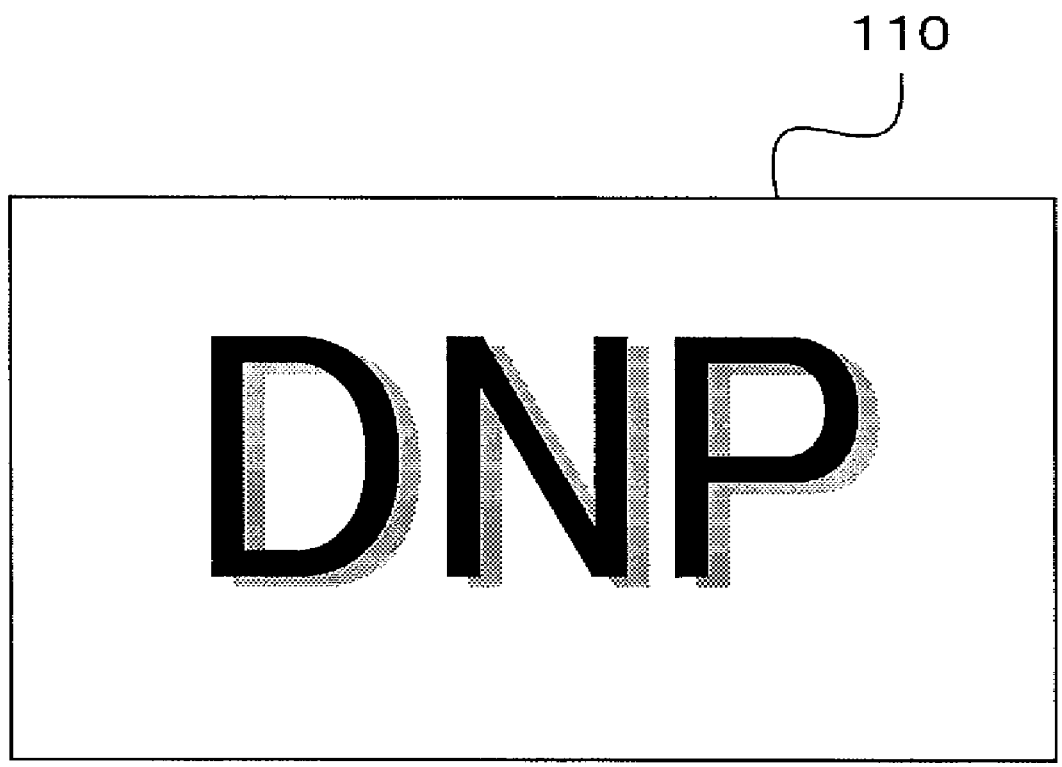
FIG. 20 shows one example of a master hologram to be used in the embodiment shown in FIG. 15.

In the hologram layer 120 of the master hologram 110 in the embodiment, as shown in FIG. 20, interference fringes for producing letters "DNP" as hologram images are formed. The object region for copying is the entire master hologram 110.

The copying method for the optical diffraction structure of the invention comprises a first transfer process and a second transfer process. First, the first transfer process will be described. The master hologram 110 and the film 111 for forming hologram are layered and set on the drum 102a while the film 111 for forming hologram being set under. As described above, the master hologram 110 and the film 111 for forming hologram are attracted to and fixed in the side face of the drum 102a by the negative pressure generated in the inside of the drum 102a. Next, The master hologram 110 is irradiated from the laser irradiation apparatus 100 with IR laser L1 in the first transfer process.

Figure 21A:
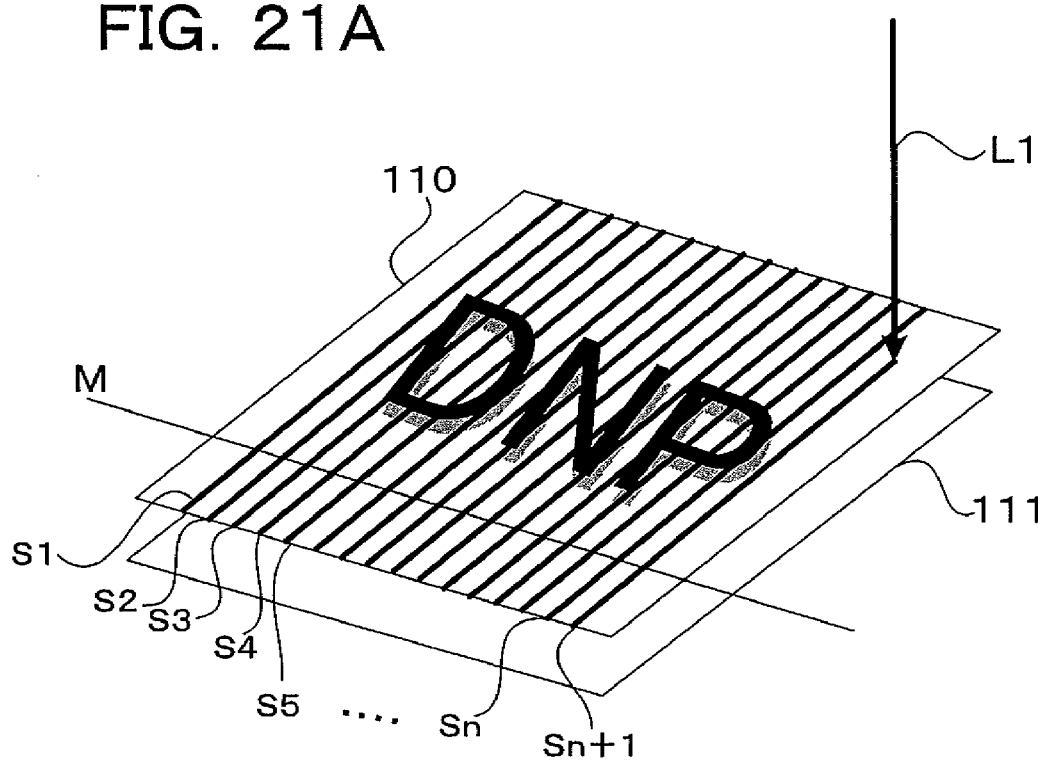
FIG. 21A shows the state that the master hologram is scanned by IR laser in the first transfer process.

As shown in FIG. 21A, the master hologram 110 is irradiated with the IR laser L1 so as to draw straight scanning lines S1 . . . Sn (hereinafter, in the case the lines are not necessary to be specially distinguished, referred simply to as "scanning lines S") in a lengthwise direction as a constant direction. The scanning lines S are drawn by shifting the irradiation range of the IR laser L1. FIG. 21A shows the state that the scanning lines S1 to Sn are already drawn and the scanning line Sn+1 is being drawn.

When the fusion layer 124 is irradiated with the IR laser L1, the light energy of the IR laser L1 is converted into heat energy to heat the irradiation range. When the temperature of the irradiation range reaches the fusing point of the fusion layer 24, the irradiation range is fused and the interference fringes overlaid in the fused part are transferred. Accordingly, as the scanning lines S are drawn by the IR laser L1, that is, the irradiation range is shifted, the interference fringes in the irradiation range of the master hologram 110 are successively transferred to the fusion layer 124 of the film 111 for forming hologram. In this embodiment, the line width and the pitches of the scanning lines S are previously set to be 65 μm and 60 μm, respectively, in the optical diffraction structure copying apparatus and the starting position and the finishing position of the respective scanning lines S are controlled based on the program taken in the control apparatus 104. When the control apparatus 104 judges that the entire body of the master hologram 110 is scanned by the IR laser L1, the first transfer process is finished. In FIG. 21A, the scanning lines S are shown as visible lines for explanation convenience, however the scanning lines are traces of the irradiation ranges of the moving IR laser L1 and no visible line is actually drawn in the master hologram 110.

Figure 21B:
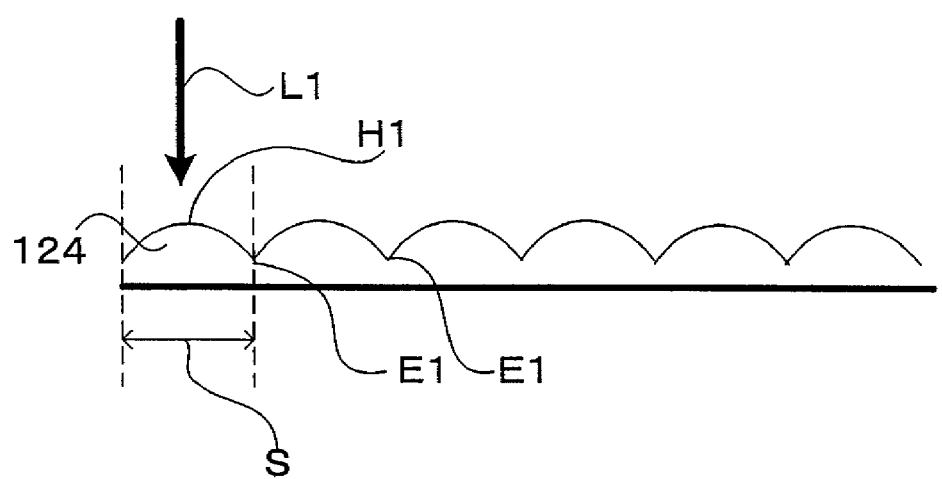
FIG. 21B is a cross-sectional view of a fusion layer obtained by the first transfer process.

FIG. 21B shows a cross-sectional view of the obtained film 111 for forming hologram on completion of the first transfer process along the line M. As shown in FIG. 21B, cyclic concavo-convex form is formed in the fusion layer 124. One rising part corresponds to the line width of one scanning line S and the highest part H1 is the center part of the irradiation range of the IR laser L1 and the lowest parts E1 are boundary parts of the irradiation range of the IR laser L1. Since the energy dose of the IR laser L1 in the center part of the irradiation range is higher than those in its boundary parts, the fusion layer 124 in the irradiation range is easy to be fused and the fusion layer 124 in the boundary parts are relatively hard to be fused. Accordingly, in the fusion layer 124 pressurized from the upper side by the master hologram 110, the part easy to be fused is easy to rise and the shape shown in FIG. 2B can be formed by drawing a plurality of scanning lines S in parallel.

Figure 22A:
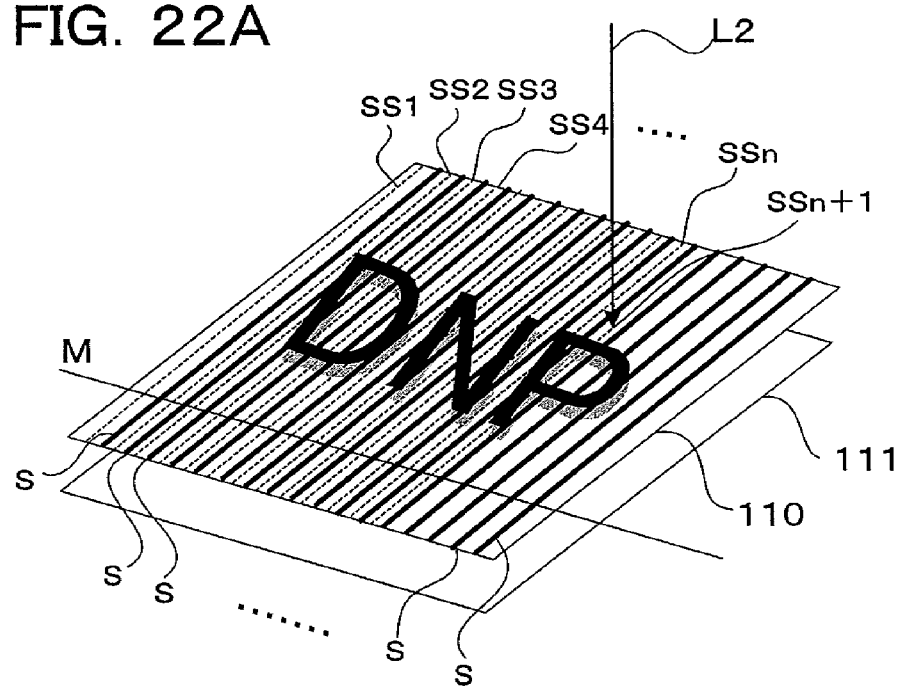
FIG. 22A shows the state that the master hologram is scanned by IR laser in the second transfer process.

Next, the second transfer process will be described. In the second transfer process, the master hologram 110 and the film 111 for forming hologram may be as they are at the time of finishing the first transfer process. In the second transfer process, the boundary parts of the scanning lines S drawn in the first transfer process are irradiated with IR laser L2 to draw scanning lines SS1 . . . SSn (hereinafter, in the case the lines are not necessary to be specially distinguished, referred simply to as "scanning lines SS") shown as dotted lines along with the scanning lines S. The scanning lines SS are drawn by shifting the irradiation range of the IR laser L2. FIG. 22A shows the state that the scanning lines SS1 . . . SSn are already drawn by the IR laser L2 on the master hologram 110 and the scanning line SSn+1 is being drawn. The energy dose of the IR laser L2 is determined relatively to the energy dose of the IR laser L1 and it may be in a range of 0.3 to 1 time as much as that of the IR laser L1. In this embodiment, the energy dose of the IR laser L2 is set so as to adjust the line width of the scanning lines SS to be 35 μm.

As the scanning lines SS are drawn, that is, with the shift of the irradiation range of the IR laser L2, because of the same reason as the principle described above, the interference fringes in the irradiation range of the master hologram 110 are successively transferred. The pitches and the line width of the scanning lines SS are previously set and the starting position and the finishing position of the respective scanning lines SS are controlled based on the program taken in the control apparatus 104. When the control apparatus 104 judges that all of the boundary parts of the scanning lines S are scanned by the IR laser L2, the second transfer process is finished. Although the scanning lines SS are drawn as visible dotted lines for explanation convenience in FIG. 22A, the scanning lines SS are traces of the irradiation range of the moving IR laser L2 and no visible dotted line is drawn actually on the master hologram 110.

Figure 22B:
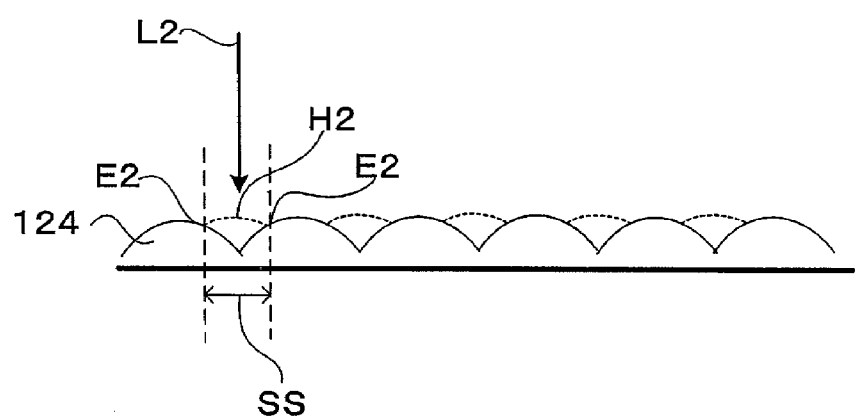
FIG. 22B is a cross-sectional view of a fusion layer obtained by the second transfer process.

FIG. 22B shows a cross-sectional view of the obtained film 111 for forming hologram on completion of the second transfer process along the line M. As shown in FIG. 22B, because of the same reason as that in the first transfer process, cyclic concavo-convex form drawn with dotted line is formed in the boundary parts of the scanning lines S. One rising part corresponds to the line width of one scanning line SS and the highest part H2 is the center part of the irradiation range of the IR laser L2 and the lowest parts E2 are boundary parts of the irradiation range of the IR laser L2. The highest part H2 is formed in the position of the lower parts E1 generated in the first transfer process, so that the height difference in the surface of the fusion layer 124 caused by the first transfer process can be amended. Accordingly, the surface of the fusion layer 124 of the film 111 for forming hologram obtained after the second transfer process is provided with improved flatness than the surface of the fusion layer 124 of the film 111 for forming hologram obtained after the first transfer process.

The method for copying an optical diffraction structure for the invention is not limited to the above-mentioned embodiment and can be performed in various embodiments. For example, in this embodiment, although the method for copying one master hologram 110 to one film 111 for forming hologram is described, master holograms 110 . . . 110 to express a plurality of hologram images or master holograms 110 . . . 110 of diffraction lattices may be combined and according to the copying method as described above, they may be copied to one film 111 for forming hologram. In this case, if the film 111 for forming hologram in which all of the master holograms 110 . . . 110 are copied is copied to an easily adhesive transparent PET film by the 2P copying method, by using this PET film as the hologram original form, it is easy to copy the hologram to express a plurality of hologram images.

Further, from the holograms and diffraction lattice patterns arranged by the invention, other holograms and diffraction lattice patterns can be repeatedly arranged by the method for the invention. In this case, when the scanning pitches employed at the initial arrangement are different from the scanning pitches employed at the second arrangement, for example, the scanning pitches of the first arrangement are adjusted to be 80 μm and the scanning pitches of the second arrangement are adjusted to be 60 μm, if not executing the flatness improvement by the invention, vertical stripes (moires) are generated by the pitch of 240 μm which is least common multiple of 60 and 80. By the flatness improvement of the invention, the vertical stripe (moires) formation can be prevented and therefore, it is not necessary that the scanning pitches of the second arrangement are not equal to the scanning pitches of the first arrangement. That is, there is an advantageous that the scanning pitches are set freely.

The energy dose of the IR laser L1 in the first transfer process may be set properly based on the raw materials and the depth of the hologram layer 120 and the fusion layer 124. The energy does of the IR laser L2 may be set higher than that of the IR laser L1. The energy doses of the respective IR laser beams L1 and L2 may be adjusted so as to obtain the flatness of the surface of the fusion layer 124 of the finally obtained film 111 for forming hologram. Also, the shifting speeds of the IR laser L1 and IR laser L2 may be set properly based on the raw materials of the fusion layer 124 and the depth of the interference fringes in the fusion layer 124 and the hologram layer 120 so as to heat the fusion layer 124 to the fuse point and then spontaneously cool the fusion layer 124 quickly.

In this embodiment, the copying method for obtaining the optical diffraction structure by two time transferring processes in total: the first transfer process and the second transfer process: is explained, and a third transfer process for irradiating the boundary parts of the scanning lines SS of the second transfer process with IR laser having smaller energy dose than that of the IR laser L2 may be further added. Thus, transfer processes similar to the second transfer process may be carried out without any limit in the times of repeating the processes.

Example 1

A photothermal conversion layer and UV curable resin layer (not-yet-cured but solid and thermoplastic) were successively formed on the surface of a substrate of a polyethylene terephthalate (PET) sheet. The surface of the not-yet-cured UV curable resin layer and a relief pattern sheet (OVD sheet) in which the diffraction lattice pattern (OVD) as a master hologram was grooved were closely attached by vacuum adsorption method to obtain a laminate.

Next, using semiconductor laser with wavelength of 808.5 nm as the laser, the above-mentioned laminate was set on XY stage while the substrate side being set in the laser irradiation side and the XY stage shown in FIG. 3 was moved to the starting point for drawing. When drawing image was instructed from PC, based on the image drawing program, the XY stage was moved according to the output image pattern so as to move the laser irradiation position and at the same time the irradiation of the IR laser was repeatedly turned on and off to draw predetermined patterns. The XY stage was moved at 20 mm/sec speed and the laser was beamed so as to adjust the spot diameter 72 μm, the laser output 0.935 W, irradiation energy per 1 dot (diameter 72 μm) 9,350×(0.072/20)=33.7 mJ, and the irradiation dose per unit length 33.7×(1/0.072)= 468 mJ. As a result, the part of the photothermal conversion layer to which the IR laser was beamed was heated and the UV-curable resin layer in the part brought into contact with the photothermal conversion layer was fused and the concavo-convex pattern form corresponding to the concavo-convex form of the OVD sheet of the relief pattern sheet, brought into contact with the UV-curable resin layer was formed in the UV-curable resin layer. After the IR laser irradiation, the relief pattern sheet was separated to obtain a concavo-convex pattern formed body where the concavo-convex pattern of the diffraction lattice was formed on the surface of the substrate sheet. The photothermal conversion layer, the UV-curable resin layer, and the relief pattern sheet were produced by the following methods.

[Formation Method for Photothermal Conversion Layer]

The following coating solution composition was produced and applied to the surface of a PET sheet by a gravure coating method (coating amount: 0.5 g/m$^2$).

[Coating Solution Composition for Photothermal Conversion Layer: Ratio on the Basis of Parts by Weight]

Carbon black (Miyoshi Kagaku: #258) 1,
Binder resin (polyester resin, TOYOBO Vylon 200) 1,
UV curing agent (Takenate A10: Mitsui Takeda Chemicals, Inc.) 0.1, and
Solvent (MEK/toluene=1/1) 8.

[Formation Method for UV-Curable Resin Layer]

The composition with the following mixing ratios was diluted with methyl ethyl ketone (MEK) r and the solid matter was adjusted in the composition to be 50% to obtain an ink, and the ink was applied to the above-mentioned photothermal conversion layer by gravure coating method (coating amount: 2 g/m$^2$).

[Composition of UV-Curable Resin Layer: Ratio on the Basis of Parts by Weight]

Urethane-modified acrylate (A) 100,
Silicone (trimethylsiloxysilicic acid-containing methylpolysiloxane, trade name: KF-7312, manufactured by Shin-Etsu Chemical Co., Ltd.) 1,
Polyfunctional urethane acrylate (trade name: Ultraviolet UV-1700B, manufactured by The Nippon Synthetic Chemical Industry Co., Ltd.) 25, and
Photopolymerization initiator (trade name: Irgacure 907, manufactured by Chiba Speciality Chemicals) 5.

The above-mentioned urethane modified-acrylate (A) was produced by the following method.

A four-neck flask having 2 L capacity equipped with a cooling apparatus, a titration funnel, and a thermometer was loaded with toluene 40 g and methyl ethyl ketone (MEK) 40 g together with an azo type initiator and a mixed solution of 2-hydroxyethyl methacrylate (HEMA) 24.6 g, methyl methacrylate (MMA) 73.7 g, dicyclopentenyloxyethyl methacrylate 24.6 g, toluene 20 g, and MEK 20 g was dropwise added through the titration funnel in about 2 hours while the reaction was carried out at the temperature of 100 to 110° C. for 8 hours and then the resulting reaction solution was cooled to a room temperature. The cooled solution was further mixed with a mixed solution of 2-isocyanate ethyl methacrylate (Karenzu MOI, manufactured by Showa Denko K.K.) 27.8 g, toluene 20 g, and MEK 20 g and using dibutyl tin laurate as a catalyst, addition reaction was carried out. The reaction product was subjected to IR analysis and when it was confirmed that the absorption peak of the isocyanate group at 2,200 cm$^{-1}$ disappeared, the reaction was finished. The obtained urethane-modified acrylate solution was found containing non-volatile components 41.0% and having a molecular weight of 30,000 measured by GPC analysis of the acrylate (solvent THF, conversion on the basis of standardized polystyrenes) and an average number of double bonds in one polymer molecule 13.0% by mole.

[Production Method for Relief Pattern Sheet]

The relief pattern sheet was produced by 2P method. A UV-curable resin (UV-SEL clear-OP vanish, manufactured by INCTEC INC.) was dropwise titrated to an easily adhesive PET sheet and the sheet was laminated on a diffraction lattice pattern resin master-hologram and UV ray was temporarily beamed and after that, the diffraction lattice pattern resin master-hologram was separated and UV ray was re-beamed to the temporarily cured relief patterns corresponding to the diffraction lattice patterns formed on the surface of the easily adhesive PET sheet to actually cure the relief patterns.

Example 2

A UV curable resin layer (not-yet-cured but solid and thermoplastic) was formed on the surface of a substrate of a polyethylene terephthalate (PET) sheet, and the surface of the not-yet-cured UV curable resin layer and a relief pattern sheet (OVD sheet) in which the diffraction lattice pattern (OVD) as a master hologram was grooved and the photothermal conversion layer was formed were closely attached by vacuum adsorption method to obtain a laminate and the laminate was irradiated with laser beam in the same manner as described in Example 1 to form the concavo-convex pattern form corresponding to the concavo-convex form of the OVD sheet of the relief pattern sheet on the UV-curable resin layer, and a concavo-convex pattern formed body was obtained, in which the concavo-convex pattern of the diffraction lattice was formed on the surface of the substrate sheet. The materials, laser drawing method and apparatus same as those employed in Example 1 were used except that the photothermal conversion layer was formed in the relief pattern sheet.

[Production Method for Relief Pattern Sheet]

First, the photothermal conversion layer was formed in the easily adhesive PET sheet. The photothermal conversion layer was formed in the same method by using the same composition as the coating composition in Example 1. Next, the UV-curable resin for a forme material (UV-SEL clear-OP vanish, manufactured by INCTEC INC.) was dropwise titrated to the photothermal conversion layer and the resulting sheet was laminated on the resin master-hologram having the diffraction lattice patterns; UV rays were temporarily beamed; and then the resin master-hologram having the diffraction lattice patterns was separated and UV rays were re-beamed to actually cure the relief patterns to obtain the sheet on which the PET sheet, the photothermal conversion layer and the relief patterns were successively formed.

We claim:
1. A method for forming fine concavo-convex patterns, the method comprising:
   providing a relief formation material comprising a substrate for the relief formation material composed of plastic film, a photothermal conversion layer 0.1 to 5 μm thick on the substrate for the relief formation material, and a relief formation layer composed of an ionizing radiation-curable resin having thermoplasticity on the photothermal conversion layer;
   forming a relief pattern sheet by coating a second ionizing radiation-curable resin composition onto a substrate, contacting the second ionizing radiation-curable resin with a diffraction lattice pattern resin master-hologram having fine concavo-convex patterns, partially curing the ionizing radiation-curable resin composition by temporarily exposing the substrate and diffraction lattice pattern resin master-hologram laminate to ionizing radiation thereby imparting the fine concavo-convex patterns from the diffraction lattice pattern resin master-hologram to the second ionizing radiation-curable resin, separating the diffraction lattice pattern resin master-hologram from the second ionizing radiation-curable resin, exposing the fine concavo-convex patterns of the substrate to further ionizing radiation to completely cure the fine concavo-convex patterns in the second ionizing radiation-curable resin;
   contacting the relief formation material and the relief pattern sheet with each other in such a manner that the relief formation layer is brought into contact with the fine concavo-convex patterns of the substrate, the fine concavo-convex patterns of the master hologram corresponding to the fine concavo-convex patterns formed on the relief formation layer;
   irradiating the photothermal conversion layer with an energy beam from the relief pattern sheet side to make the photothermal conversion layer generate heat; and
   separating the relief pattern sheet and the relief formation layer and exposing the relief formation layer to curing ionizing radiation.

2. The method for forming fine concavo-convex patterns according to claim 1, further comprising providing the relief formation layer as an ionizing radiation-curable resin having thermoplasticity.

3. The method for forming fine concavo-convex patterns according to claim 1, wherein during the contacting step, the relief formation material and the relief pattern sheet are attached to each other by vacuum adsorption.

* * * * *